United States Patent
Tena et al.

(10) Patent No.: US 8,922,553 B1
(45) Date of Patent: Dec. 30, 2014

(54) INTERACTIVE REGION-BASED LINEAR 3D FACE MODELS

(75) Inventors: Jose Rafael Tena, Pittsburgh, PA (US); Fernando De la Torre, Pittsburgh, PA (US); Iain Matthews, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 862 days.

(21) Appl. No.: 13/089,675

(22) Filed: Apr. 19, 2011

(51) Int. Cl.
*G06T 17/00* (2006.01)
*G06T 17/20* (2006.01)
*G06T 13/00* (2011.01)
*G06T 13/20* (2011.01)
*G06T 13/40* (2011.01)

(52) U.S. Cl.
CPC ............... *G06T 17/00* (2013.01); *G06T 17/20* (2013.01); *G06T 13/40* (2013.01); *G06T 13/20* (2013.01); *G06T 13/00* (2013.01)
USPC ........................... 345/423; 345/473; 345/419

(58) Field of Classification Search
USPC .................................................. 345/423, 473
See application file for complete search history.

(56) References Cited

PUBLICATIONS

Lewis, J. P., et al., "A User Interface Technique for Controlling Blendshape Interference," Data-Driven 3D Facial Animation, Springer London, 2007, pp. 132-144.*
Deng, Zhigang, et al. "Animating blendshape faces by cross-mapping motion capture data." Proceedings of the 2006 symposium on Interactive 3D graphics and games, pp. 43-48, ACM, 2006.*
Xuecheng Liu, Tianlu Mao, Shihong Xia, Yong Yu, and Zhaoqi Wang, "Facial animation by optimized blendshapes from motion capture data", Computer Animation and Virtual Worlds, vol. 19, Issue 3-4 (Sep. 2008), 13 pages.*
Basso, C., and Vetter, T., "Statistically motivated 3D faces reconstruction", Proceedings of the 2nd international conference on reconstruction of soft facial parts, vol. 31, 17 pages, 2005.*
Lorach, Tristan. "GPU blend shapes." NVIDIA Corporation (2007).*
Jun Wang and Shihong Xia, 2011, "Layered interpolation for interactive avatar control", Proceedings of the 10th International Conference on Virtual Reality Continuum and Its Applications in Industry (VRCAI '11), ACM, New York, NY, USA, pp. 49-58.*
Lewis, J.P., "Reducing Blendshape Interference by Selected Motion Attenuation," Published in I3D '05 Proceedings of the 2005 symposium on Interactive 3D graphics and games, pp. 25-29.
Ekman, Paul, et al., "Facial Action Coding System, The Manual on CD Rom, HTML Demonstration Version," [online], published by a Human Face, 2002, ISBN 0-931835-01-1, [retrieved on Oct. 3, 2013], retrieved from the internet :<URL: http://face-and-emotion.com/dataface/facs/manual.html <, 8 pages.
Tenenbaum, Joshua B., "A Global Geometric Framework for Nonlinear Dimensionality Reduction," Science, Dec. 22, 2000, vol. 290, 5 pages.

(Continued)

*Primary Examiner* — Ulka Chauhan
*Assistant Examiner* — Roberta D Prendergast
(74) *Attorney, Agent, or Firm* — Kilpatrick Townsend & Stockton LLP

(57) ABSTRACT

An improved modeling system and associated techniques are described herein. In various embodiments, a modeling system generates a spatially local PCA model where the parts are connected with continuity constraints (e.g., soft constraints) in the boundaries. Experimental results on 3D face modeling show that the spatially local PCA model generalizes better than a holistic model. Moreover, the modeling system smoothly varies local control points for face posing in animation.

26 Claims, 28 Drawing Sheets

(56) References Cited

PUBLICATIONS

Allen, B., et al., "The space of human body shapes: Reconstruction and parameterization from range scans," ACM Transactions on Graphics, Jul. 2003, vol. 22, No. 3, pp. 587-594.

Black, M., et. al., "Tracking and recognizing rigid and non-rigid facial motions using local parametric models of image motion," Proceedings of the Fifth International Conference on Computer Vision, 1995, pp. 374-381.

Blanz, V., et al., "A morphable model for the synthesis of 3d faces," Proceedings of SIGGRAPH 99, Computer Graphics Proceedings, 1999, Annual Conference Series, pp. 187-194.

Buck, I., et al., "Performance-driven hand-drawn animation," Proceedings of the 1st International Symposium on Non-photorealistic Animation and Rendering, 2000, ACM, New York, NY, USA, NPAR '00, pp. 101-108.

Cootes, et al., "Active shape models—their training and application," Computer Vision and Image Understanding, Jan. 1995, vol. 61, pp. 38-59.

Cootes, T. F., et al., "Active appearance models," Proceedings of the 5th European Conference on Computer Vision, 1998, pp. 484-498.

Dryden, I. L., et al., "Statistical Shape Analysis," 2002, John Wiley & Sons, 8 pages.

Edwards, G. J., et al., "Face recognition using active appearance models," Proceedings of the 5th European Conference on Computer Vision, 1998, pp. 581-595.

Feng, W., et al., "Real-time data driven deformation using kernel canonical.correlation analysis," ACM Transactions on Graphics, Aug. 2008, vol. 27, 10 pages.

Joshi, P., et al., "earning controls for blend shape based realistic facial animation," Proceedings of the 2003 ACMSIGGRAPH/Eurographics symposium on Computer animation, 2003, Eurographics Association, Aire-la-Ville, Switzerland, Switzerland, SCA '03, pp. 187-192.

Lau, M., et al., "Face poser: Interactive modeling of 3d facial expressions using facial priors," ACM Transactions on Graphics, Dec. 2009, vol. 29, No. 1, 17 pages.

Lawrence, N. D., "Learning for larger datasets with the gaussian process latent variable model," International Work shop on Artificial Intelligence and Statistics, 2007, 8 pages.

Lewis, J., et al., "Direct manipulation blend shapes," Computer Graphics and Applications, 2010, IEEE vol. 30, No. 4 (Jul.-Aug.), pp. 42-50.

Matthews, I., et al., "Active appearance models revisited," International Journal of Computer Vision Nov. 2004, vol. 60, pp. 135-164.

Meyer, M., et al., "Key point subspace acceleration and soft caching," ACM Transactions on Graphics, Jul. 2007, vol. 26, No. 3, 8 pages.

Ng, A. Y., et al., "On spectral clustering: Analysis and an algorithm," Advances in Neural Information Processing Systems, 2001, MIT Press, pp. 849-856.

Nishino, K., et al., "Clustered blockwise pca for representing visual data," IEEE Transactions on Pattern Analysis Machine Intelligence, Oct. 2005, vol. 27, pp. 1675-1679.

Noh, J., et al., "Animated deformations with radial basis functions," Proceedings of the ACM symposium on Virtual reality software and technology, 2000, ACM, New York, NY, USA, VRST '00, pp. 166-174.

Pentland, A., et al., "View-based and modular eigenspaces for face recognition," Computer Vision and Pattern Recognition, 1994, Proceedings CVPR '94., IEEE Computer Society Conference, pp. 84-91.

Peyras, J., et al., "Segmented aams improve person-independent face fitting," British Machine Vision Conference, 2007 (BMVC2007), British Machine Vision Association (BMVA), http://www.bmva.ac.uk [on line].

Pighin, F., et al., "Synthesizing realistic facial expressions from photographs," Proceedings of SIGGRAPH 98, Computer Graphics Proceedings, 1998, Annual Conference Series, pp. 75-84.

Tena, J. R., et al., "A validated method for dense non-rigid 3D face registration," Proceedings of the IEEE International Conference on Video and Signal Based Surveillance, 2006, IEEE Computer Society, Washington, DC, USA, AVSS '06, 6 pages.

Turk, M., et al., "Eigenfaces for recognition," Journal of Cognitive Neuroscience, Jan. 1991, vol. 3, pp. 71-86.

Vlasic, D., et al., "Face transfer with multilinear models," ACM Transactions on Graphics, Aug. 2005, vol. 24, No. 3, pp. 426-433.

Zhang, L., et al., "Spacetime faces: high resolution capture for modeling and animation," ACM Transactions on Graphics, Aug. 2004, vol. 23, No. 3, pp. 548-558.

Zhang, Q., et al., "Geometry-driven photorealistic facial expression synthesis," IEEE Transactions on Visualization and Computer Graphics, Jan. 2006, vol. 12, pp. 48-60.

\* cited by examiner

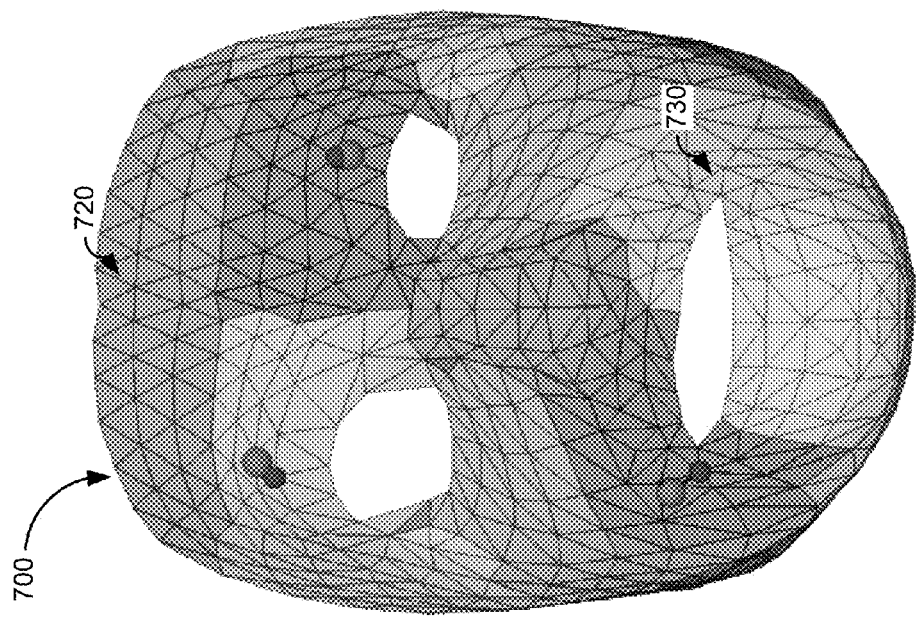
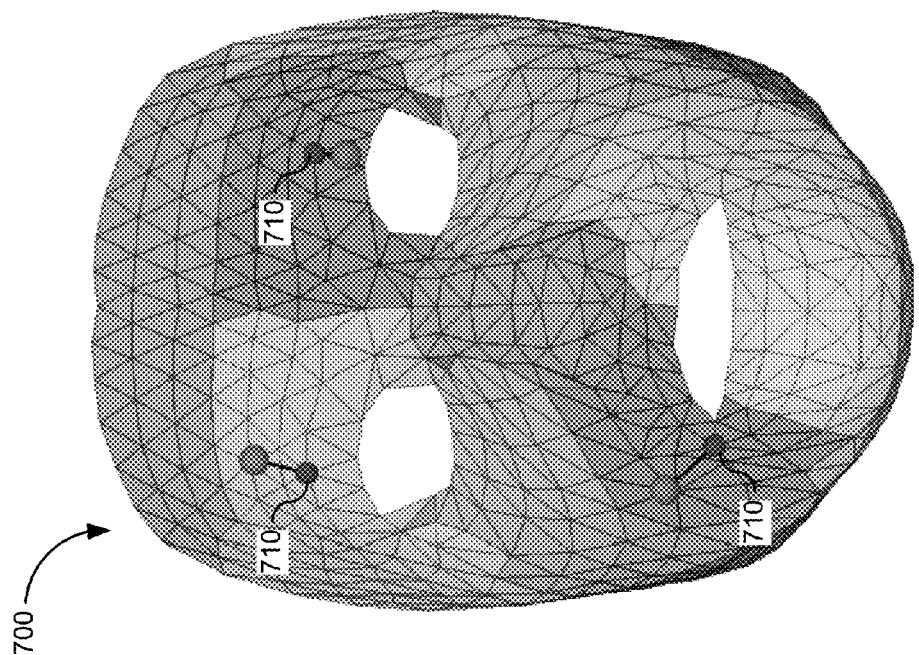

INTERACTIVE REGION-BASED LINEAR 3D FACE MODELS

FIELD OF THE INVENTION

This disclosure relates to computer-generated imagery (CGI) and computer-aided animation. More specifically, this disclosure relates to techniques for generating interactive region-based linear 3D face models for use in CGI and computer-aided animation.

BACKGROUND OF THE INVENTION

With the wide-spread availability of computers, individuals such as graphics artists and animators more frequently relying upon computers to assist in production processes for creating computer-generated imagery (CGI) and computer-aided animation. This may include using computers to represent physical models of objects with virtual models of the object stored in computer memory.

In CGI and computer-aided animation, one of the first steps in a production process is typically the object modeling process. A user of a computer system may sculpt models of objects much like real clay or plaster, working from general forms to specific details, for example, with various sculpting tools provided by one or more software programs. Models may further be constructed from information obtained about physical object, for example, out of geometrical vertices, faces, and edges in a two-dimensional (2D) or three-dimensional (3D) coordinate system to represent the physical objects. In one instance, a user (e.g., a skilled computer graphics artist) may specify the mathematical description of various objects, such as the geometry and/or topology of characters, props, backgrounds, scenes, or the like. In another instance, a user (e.g., an articulator or rigger) may specify a number of model components or animation control variables (avars) that may be used to position all or part of a model or otherwise manipulate aspects of the model.

In yet another instance, a user (e.g., a skilled graphics artist or skilled animator) may manipulate or otherwise pose the virtual models to be used in an image or animation sequence. For example, an animator may specifying motions and positions of all or part of a model at various points in time to create an animation sequence. Accordingly, these virtual models can then be modified or manipulated using computers as characters or other elements of a computer animation display, for example, to simulate physical motion, design aesthetic actions such as poses or other deformations, create lighting effects, coloring and paint, or the like.

As such, various stages of the production of CGI and computer-aided animation may involve the extensive use of general purposes computer, specialized hardware, and software tools incorporating various computer graphics techniques to produce a visually appealing image from the geometric or mathematical description of an object to convey an essential element of a story or otherwise provide a desired special effect. One of the challenges in creating these visually appealing images can be the balancing of a desire for a highly-detailed image of a character or other object with the practical issues involved in allocating the resources (both human and computational) required to produce those visually appealing images.

In certain areas of the production of CGI and computer-aided animation, the development of models can involve the use of principal component analysis (PCA). PCA is a mathematical procedure that uses an orthogonal transformation to convert a set of observations of possibly correlated variables into a set of values of uncorrelated variables called principal components. Linear PCA models have been used successfully in the fields of Computer Vision and Computer Graphics for a wide range of tasks. In some cases, linear models have been replaced by more sophisticated ones that provide better performance at the expense of increased computational complexity [17]. However, linear models continue to be of common use because of their simplicity and inexpensive computational nature.

Accordingly, what is desired is to solve one or more of the problems relating to creating interactive linear models for use in CGI and computer-aided animation, some of which may be discussed herein. Additionally, what is desired is to reduce some of the drawbacks relating to using interactive region-based linear 3D face models in CGI and computer-aided animation, some of which may be discussed herein.

REFERENCES

[1] ALLEN, B., CURLESS, B., AND POPOVIĆ, Z. 2003. The space of human body shapes: Reconstruction and parameterization from range scans. *ACM Transactions on Graphics* 22, 3 (July), 587-594.

[2] BERGERON, P., AND LACHAPELLE, P. 1985. Controlling facial expressions and body movements in the computer-generated animated short "Tonly De Peltrie." In *Computer Graphics, Advanced Computer Animation* seminar notes.

[3] BLACK, M., AND YACOOB, Y. 1995. Tracking and recognizing rigid and non-rigid facial motions using local parametric models of image motion. In *Proceedings of the Fifth International Conference on Computer Vision*, 374-381.

[4] BLANZ, V., AND VETTER, T. 1999. A morphable model for the synthesis of 3d faces. In *Proceedings of SIGGRAPH 99*, Computer Graphics Proceedings, Annual Conference Series, 187-194.

[5] BUCK, I., FINKELSTEIN, A., JACOBS, C., KLEIN, A., SALESIN, D. H., SEIMS, J., SZELISKI, R., AND TOYAMA, K. 2000. Performance-driven hand-drawn animation. In *Proceedings of the 1st International Symposium on Non-photorealistic Animation and Rendering*, ACM, New York, N.Y., USA, NPAR '00, 101-108.

[6] COOTES, T. F., TAYLOR, C. J., COOPER, D. H., AND GRAHAM, J. 1995. Active shape models—their training and application. *Computer Vision and Image Understanding* 61 (January), 38-59.

[7] COOTES, T. F., EDWARDS, G. J., AND TAYLOR, C. J. 1998. Active appearance models. In *Proceedings of the 5th European Conference on Computer Vision (ECCV 1998)*, 484-498.

[8] DRYDEN, I. L., AND MARDIA, K. V. 2002. Statistical Shape Analysis. John Wiley & Sons.

[9] EDWARDS, G. J., COOTES, T. F., AND TAYLOR, C. J. 1998. Face recognition using active appearance models. In *Proceedings of the 5th European Conference on Computer Vision (ECCV 1998)*, 581-595.

[10] EKMAN, P., AND FRIESEN, W. V. 1978. *Facial Action Coding System: A Technique for the Measurement of Facial Movement*. Consulting Psychologists Press, Palo Alto, Calif.

[11] FENG, W.-W., KIM, B.-U., AND YU, Y. 2008. Real-time data driven deformation using kernel canonical correlation analysis. *ACM Transactions on Graphics* 27 (August), 91:1-91:9.

[12] JOSHI, P., TIEN, W. C., DESBRUN, M., AND PIGHIN, F. 2003. Learning controls for blend shape based realistic facial animation. In *Proceedings of the 2003 ACM SIG-GRAPH/Eurographics symposium on Computer animation*, Eurographics Association, Aire-la-Ville, Switzerland, Switzerland, SCA '03, 187-192.

[13] LAU, M., CHAI, J., XU, Y.-Q., AND SHUM, H.-Y. 2009. Face poser: Interactive modeling of 3d facial expressions using facial priors. *ACM Transactions on Graphics* 29, 1 (December), 3:1-3:17.

[14] LAWRENCE, N. D. 2007. Learning for larger datasets with the gaussian process latent variable model. In *International Workshop on Artificial Intelligence and Statistics*.

[15] LEWIS, J., AND ANJYO, K.-I. 2010. Direct manipulation blend shapes. *Computer Graphics and Applications, IEEE* 30, 4 (July-August), 42-50.

[16] MATTHEWS, I., AND BAKER, S. 2004. Active appearance models revisited. *International Journal of Computer Vision* 60 (November), 135-164.

[17] MEYER, M., AND ANDERSON, J. 2007. Key point subspace acceleration and soft caching. *ACM Transactions on Graphics* 26, 3 (July), 74:1-74:8.

[18] N G, A. Y., JORDAN, M. I., AND WEISS, Y. 2001. On spectral clustering: Analysis and an algorithm. In *Advances in Neural Information Processing Systems*, MIT Press, 849-856.

[19] NISHINO, K., NAYAR, S. K., AND JEBARA, T. 2005. Clustered blockwise pca for representing visual data. *IEEE Transactions on Pattern Analysis Machine Intelligence* 27 (October), 1675-1679.

[20] NOH, J.-Y., FIDALEO, D., AND NEUMANN, U. 2000. Animated deformations with radial basis functions. In *Proceedings of the ACM symposium on Virtual reality software and technology*, ACM, New York, N.Y., USA, VRST '00, 166-174.

[21] PENTLAND, A., MOGHADDAM, B., AND STARNER, T. 1994. View-based and modular eigenspaces for face recognition. In *Computer Vision and Pattern Recognition, 1994. Proceedings CVPR '94., 1994 IEEE Computer Society Conference on*, 84-91.

[22] PEYRAS, J., BARTOLI, A., MERCIER, H., AND DALLE, P. 2007. Segmented aams improve person-independent face fitting. In *British Machine Vision Conference 2007 (BMVC2007)*, British Machine Vision Association (BMVA), http://www.bmva.ac.uk, A. Bhalerao and N. Rajpoot, Eds., (on line).

[23] PIGHIN, F., HECKER, J., LISCHINSKI, D., SZELISKI, R., AND SALESIN, D. H.1998. Synthesizing realistic facial expressions from photographs. In *Proceedings of SIGGRAPH 98*, Computer Graphics Proceedings, Annual Conference Series, 75-84.

[24] TENA, J. R., HAMOUZ, M., HILTON, A., AND ILLINGWORTH, J. 2006. A validated method for dense non-rigid 3D face registration. In *Proceedings of the IEEE International Conference on Video and Signal Based Surveillance*, IEEE Computer Society, Washington, D.C., USA, AVSS '06, 81-.

[25] TENENBAUM, J. B., DE SILVA, V., AND LANGFORD, J. C. 2000. A global geometric framework for nonlinear dimensionality reduction. *Science* 290, 5500, 2319-2323.

[26] TURK, M., AND PENTLAND, A. 1991. Eigenfaces for recognition. *Journal of Cognitive Neuroscience* 3 (January), 71-86.

[27] VLASIC, D., BRAND, M., PFISTER, H., AND POPOVIĆ, J. 2005. Face transfer with multilinear models. *ACM Transactions on Graphics* 24, 3 (August), 426-433.

[28] ZHANG, L., SNAVELY, N., CURLESS, B., AND SEITZ, S. M. 2004. Spacetime faces: high resolution capture for modeling and animation. *ACM Transactions on Graphics* 23, 3 (August), 548-558.

[29] ZHANG, Q., LIU, Z., GUO, B., TERZOPOULOS, D., AND SHUM, H.-Y. 2006. Geometry-driven photorealistic facial expression synthesis. *IEEE Transactions on Visualization and Computer Graphics* 12 (January), 48-60.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

An improved modeling system and associated techniques are described herein. In various embodiments, a modeling system generates a spatially local PCA model where the parts are connected with continuity constraints (e.g., soft constraints) in the boundaries. Experimental results on 3D face modeling show that the spatially local PCA model generalizes better than a holistic model. Moreover, the modeling system smoothly varies local control points for face posing in animation.

In some embodiments, methods are provided for manipulating a surface of a computer-generated face. Information is received associating a first data set with the surface of the computer-generated face. A plurality of regions are then determined or identified for the surface of the computer-generated face based on the first data set. For each determined region, a linear model of a set of behaviors of the region is generated (e.g., trained) based on the first data set. The first data set may include training data, such as obtained from a motion capture source.

In other embodiment, using spatially local models of a surface of a computer-generated face, a second data set may be received. The second data set may define one or more manipulations to be performed to the surface of the computer-generated face. For the one or more manipulations defined by the second data set, a solution is determined that is globally applicable to the surface of the computer generated face. The global solution satisfies each continuity constraint in a set of one or more continuity constraints associated with the plurality of linear models and reduces one or more error metrics. Information may be generated based on the global solution to manipulate the surface of the computer-generated face.

In some embodiments, determining, for the one or more manipulations defined by the second data set, the solution globally applicable to the surface of the computer generated face that satisfies each continuity constraint in the set of one or more continuity constraints associated with the plurality of linear models and that reduces the one or more error metrics may include simultaneously solving for each linear model in the plurality of models while explicitly enforcing each continuity constraint in the set of one or more continuity constraints. In some aspects, contribution of each continuity constraint in the set of one or more continuity constraints may be weighted to selected error metrics in the one or more error metrics.

In further embodiments, determining a plurality of regions for the surface of the computer-generated face may include determining the plurality of regions using spectral clustering on a set of affinity matrices. In another aspect, determining the plurality of regions for the surface of the computer-generated face based on training data may include receiving information from a user guiding identification of at least one region in the plurality of regions.

In various embodiments, one or more continuity constraint in a set of continuity constraints associated with the plurality of linear models may be generated as a spatial constraint indicative of how much boundary is shared between at least two regions in the plurality of regions. In some aspects, at least two regions in the plurality of regions share at least one vertex. In other aspects, at least two regions in the plurality of regions overlap at least two vertices. In a further embodiment, one or more continuity constraint in a set of continuity constraints associated with the plurality of linear models may be generated as a temporal constraint indicative of how far a location moves over time in a parameter space.

In several aspects, information may be generated that is configured based on the at least one solution to manipulate the surface of the computer-generated face as information configured to manipulate shape of the surface.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims. Additional methods, systems, computer-readable media, and data structures are provided or envisioned implementing techniques of this disclosure.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 7A is an illustration depicting a mesh of a computer generated face associated with a plurality of region-based linear models together with one or more manipulations that may be performed with respect to the eyes and mouth in accordance with one embodiment.

FIG. 7B is an illustration depicting one or more deformations made by the system of FIG. 1 to the mesh of the computer-generated face of FIG. 7A when using a region-based approach such that the one or more manipulations that may be performed with respect to eyes and mouth do not cause undesired effects in the rest of the facial model in accordance with one embodiment.

FIG. 9A is an illustration of the mesh of the computer-generated face of FIG. 7A depicting results using correlation as distance metric. FIG. 9B is an illustration of the mesh of the computer-generated face of FIG. 7A depicting results using a combination of correlation and distance on the mesh. FIG. 9C is an illustration of the mesh of the computer-generated face of FIG. 7A depicting results using distance on the mesh only.

FIG. 13A is graph depicting error between user-given constraints and constrained vertices outputted by a model of a computer-generated face. FIG. 13B is a graph depicting error at inter-region boundaries, which is null for the holistic model. FIG. 13C is a graph depicting error between all un-constrained vertices of a model of a computer-generated face and previous configuration states.

DETAILED DESCRIPTION OF THE INVENTION

Linear models, particularly those based on principal component analysis (PCA), have been used successfully on a broad range of human face-related applications. Although PCA models achieve high compression, such models have not been widely used for animation because the model bases lack a semantic interpretation. The model parameters are not an intuitive set for animators to work with. Additionally, a holistic PCA representation of faces that can generalize to express all facial expressions would require training data containing a uniform distribution over all possible combinations of the different parts of the face. The collection of such a data set would not only be difficult, but also unlikely.

An improved modeling system and associated techniques are described herein to alleviate these problems. In various embodiments, a modeling system generates a spatially local PCA model where the parts are connected with soft constraints in the boundaries. Experimental results on 3D face modeling show that the spatially local PCA model generalizes better than a holistic model. Moreover, the modeling system smoothly varies local control points for face posing in animation.

INTRODUCTION

Figure 1:
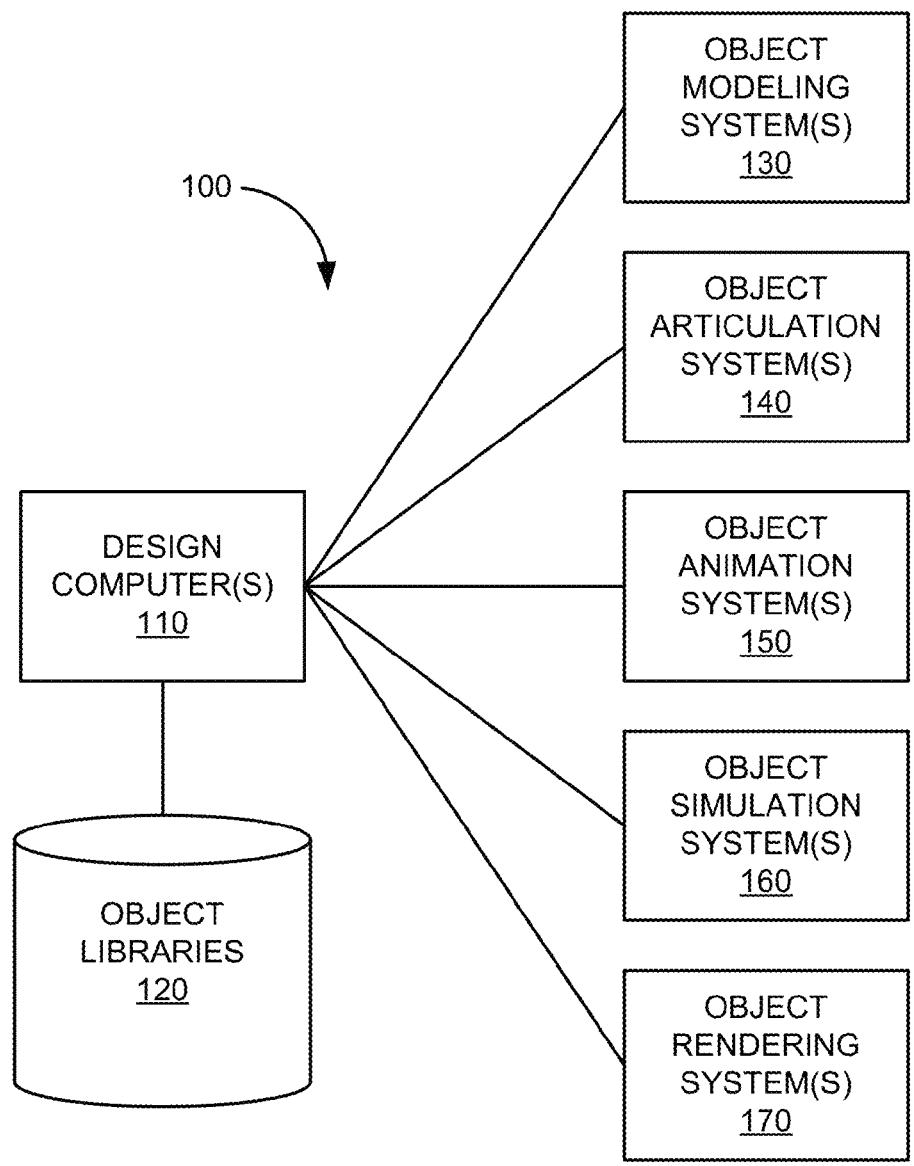
FIG. 1 is a simplified block diagram of a system for creating computer graphics imagery (CGI) and computer-aided animation that may implement or incorporate various embodiments or techniques for linear models.

FIG. 1 is a simplified block diagram of system 100 for creating computer graphics imagery (CGI) and computer-aided animation that may implement or incorporate various embodiments or techniques for linear models. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for interactive region-based linear models.

Linear Models

Linear models, particularly those based on principal component analysis (PCA), have been used successfully on a broad range of human face-related applications, examples include Active Shape Models [6], Active Appearance Models [7,16], and 3D Morphable Models [4]. In the production of computerized facial animation, a common practice is to use blendshape animation models (or rigs). These models aim to represent a given facial configuration as a linear combination of a predetermined subset of facial poses that define the valid space of facial expressions [2, 23]. PCA models and blendshape models differ from each other only in the nature of their bases vectors. The bases are orthogonal and lack a semantic meaning in PCA models versus non-orthogonal with a clear interpretable meaning for blendshape models. Although PCA models achieve high compression, they are not generally used for animation because model bases lack a semantic interpretation. Furthermore, model parameters are not an intuitive set for animators to work with.

Figure 2:
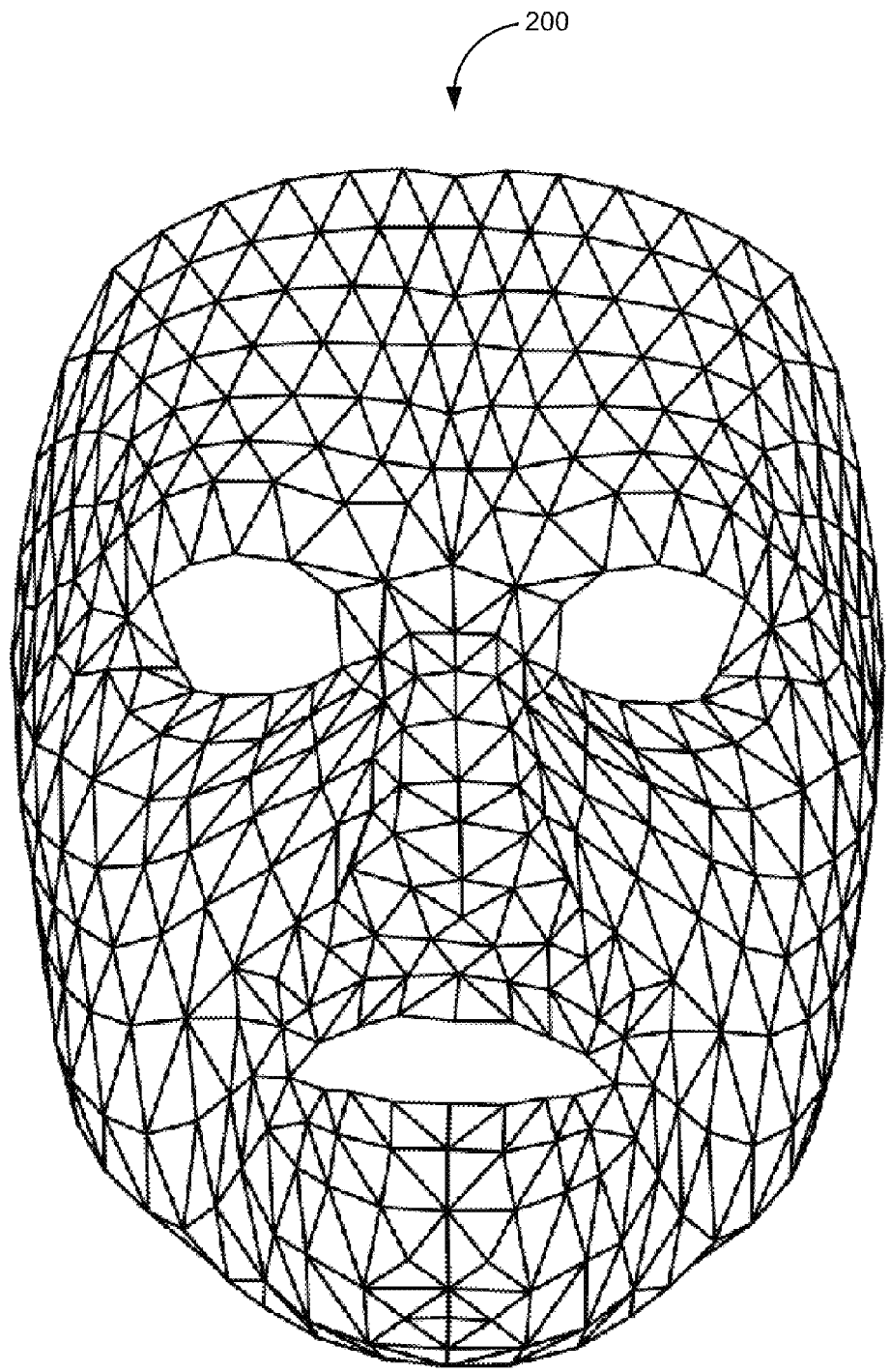
FIG. 2 is an illustration of a mesh of a computer-generated face that may be used by the system of FIG. 1.

FIG. 2 is an illustration of mesh 200 of a computer-generated face that may be used by system 100 of FIG. 1. Mesh 200 may include a plurality of points in a N-dimensional embedding space (e.g., a three-dimensional space) controlled by a set of parameters, controls, or animation variables. Parameters or controls may be configured to influence elements of mesh 200, such as individual points or more complex structures such as eyes, a nose, a mouth, cheeks, eyebrows, a forehead, etc. Some examples may include parameters or controls describing variance among facial elements (e.g., eyes, noses, mouths, etc.) and expression parameters describing facial "actions" (e.g., stretching lips, closing eyes, furrowing the brow, etc.).

Figure 3B:
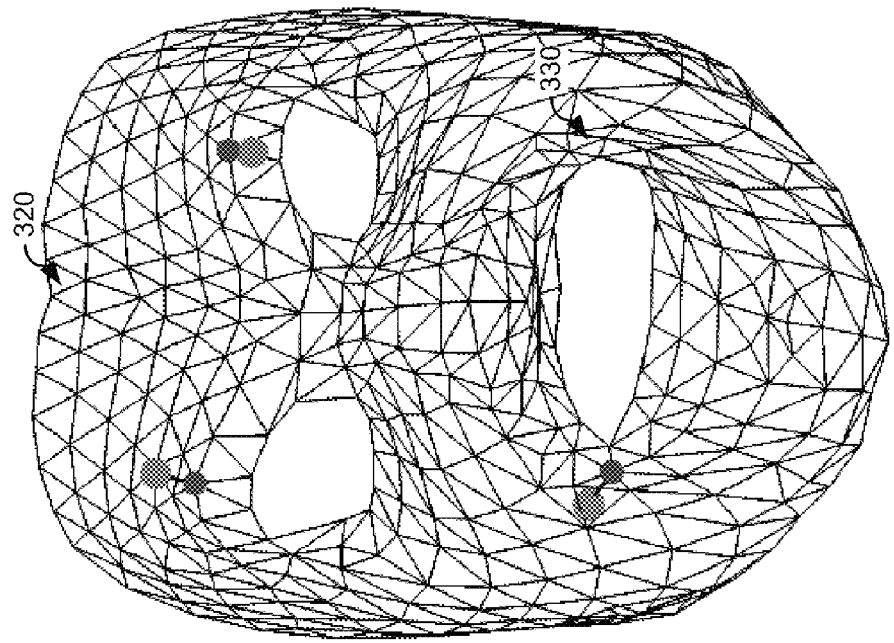
FIG. 3B is an illustration depicting one or more deformations made by the system of FIG. 1 to the mesh of the computer-generated face of FIG. 2 when using a holistic approach such that the one or more manipulations performed with respect to the eyes and mouth of the computer-generated face cause undesired effects in the rest of the mesh.
Figure 3A:
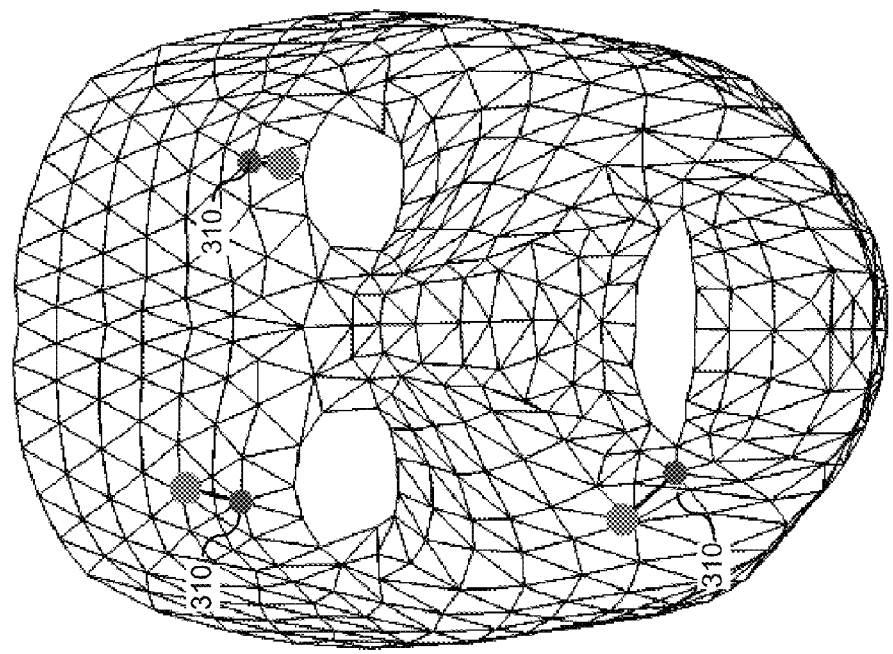
FIG. 3A is an illustration depicting the mesh of the computer-generated face of FIG. 2 together with one or more manipulations to be performed with respect to the eyes and mouth of the computer-generated face.

FIG. 3A is an illustration depicting mesh 200 of the computer-generated face of FIG. 2 together with one or more manipulations to be performed with respect to the eyes and mouth of the computer-generated face. In this example, certain control points associated with mesh 200 for the eyes and mouth are manipulated to create the appearance of a wink and smirk. Specifically, a user may specify that control points 310 (e.g., points controlling a portion of mesh 200 representing the eye lids and mouth corners) are to be moved from a first location (e.g., represented by a dark shaded circle) to or toward a second location (e.g., represented by a larger lighter shaded circle).

FIG. 3B is an illustration depicting one or more deformations made by system 100 of FIG. 1 to mesh 200 of the computer-generated face of FIG. 2 when using a holistic approach such that the one or more manipulations performed with respect to the eyes and mouth of the computer-generated face cause undesired effects in the rest of mesh 200. In this example, imputation using a holistic model alters the configuration of the whole computer-generated face. Notice the alteration to the configuration of the computer-generated face in areas 320 and 330.

Accordingly, in various embodiments, system 100 reduces alteration to the whole configuration of computer-generated faces by employing region-based linear models that relate to each other through shared boundaries. Rather than following the convention of weighted blending for managing boundary discontinuities, system 100 restricts model solutions to have consistent boundaries while simultaneously enforcing user given constraints in a soft least squares sense. In one example, a PCA region-based face model generated by system 100 may use dense facial motion capture data and be flexible enough to generalize to multiple people. Segmentation of a face into multiple sub-models by system 100 also allows user interaction to modify the model at a local level, which would not be possible with a holistic model as further explain below. In the context of face-posing for keyframe animation, system 100 generates region-based models that are locally intuitive and globally consistent. This disclosure provides a mathematical formulation that is applicable in computer-graphics programs to any kind of linear model and is not restricted to computer-generated faces.

One of the earlier works that introduced PCA models into computer vision is that of Turk and Pentland [26] with their eigenface approach to face recognition. The work of Turk and Pentland was followed by Cootes et. al with active shape an active appearance models [6,7] which have been used for face recognition [7] and tracking [16] among many other applications. Blanz and Vetter [4] applied the concept of active appearance models into the realm of 3D and computer graphics with their work in face morphable models. Allen et. al [1] built linear PCA shape models of human bodies in 3D. More recently, Vlasic et. al [27] proposed a higher order of the linear model called multilinear, which they used for modeling identity, expression, and speech independently. The work cited here comprises only a small sample of the successful application of linear models.

Previous work in face modeling has also decomposed faces into regions to improve expressiveness. An early example is the work by Black and Yacoob [3] which explored the use of local parameterized models for recovering and recognizing non-rigid motion in human faces. In work on 3D morphable models, Blanz and Vetter [4] divided the face into four regions to augment the expressiveness of their PCA model. When fitting the model to images each region was optimized independently, resulting in four different 3D models which were then blended following a Gaussian pyramid approach.

Joshi et. al [12] propose an automatic, physically-motivated segmentation of the face. Joshi et al. created regions with overlapping boundaries and solved for each region independently, followed by an optimization with a set of blending weights. Zhang et. al [28] presented a system for synthesizing facial expressions applicable to 2D images and 3D face models. Zhang et. al empirically divided the face into several regions to allow the synthesis of asymmetric expressions. To avoid image discontinuity at region boundaries, Zhang et. al did a fade-in-fadeout blending using a manually defined weight map. Zhang et. al [29] created a linear 3D face model for animation which is automatically segmented in regions at runtime depending on the user edits. The segmented regions are independently modeled and then blended into a single expression. Since the regions are created at runtime, they are modeled using a scheme called proximity based weighting to avoid the more expensive PCA calculation for each region.

In contrast to a region-based model generated by system 100, the above described model behave more like a holistic model. Additionally, some of the models require optimization with a set of blending weights of overlapping boundaries or avoidance of image discontinuity at region boundaries using a manually defined blending.

There is also related work on creating face models that allow localized modifications without explicitly dividing the face into regions. Noh and colleagues [20] used radial basis functions to produce localized real-time deformations by controlling an arbitrary sparse set of control points. Feng and his collaborators [11] described an animation interface that learns optimal control points from a set of surface deformation examples. The control points are mapped through canonical correlation analysis to a sparse set of abstract bones whose deformation parameters specify the deformation of every vertex on the surface. The user can then create new deformations by modifying the position of the optimal control points. Lau et al. [13] presented a system for interactive modeling of 3D facial expressions using facial priors. Lau formulated the problem of face posing in a maximum a posteriori framework that combines user inputs with priors embedded in a large set of facial expression data. Lau's approach optimizes a non-linear cost function with terms for different types of user-provided constraints and facial priors from expression data. This method allows the user to modify any region of the face. However, the local behavior is limited by the data available in the database of facial expressions.

Meyer and Anderson [17] described a linear modeling method for imputing the complete facial shape from a small subset of points that best characterize the model's sub-space. The linear subspace is first obtained using PCA, and the resulting basis vectors are then rotated to find a bases which components may model local variations. More recently, Lewis and Anjyo [15] presented a mathematical formulation for manipulating blendshape models based on user-provided constraints. Lewis' approach provides a least squares solution to the ill-posed problem of computing the model's blending weights from a sparse set of constraints. Lewis' method can produce localized changes if they belong to the space defined by the blendshapes.

Region Based Linear Face Modeling

In various embodiments, system 100 builds a modular subspace in order to increase a model's expressiveness. Traditionally, techniques that create modular subspaces treat each space as completely independent region and then implement one or more blending schemes to deal with discontinuities at the inter-region boundaries [5]. In contrast, system 100 solves for all the independent subspaces simultaneously while explicitly enforcing boundary consistency in a soft least squares sense. The use of soft constraints allows slight discrepancies at the inter-region boundaries, keeping the model flexible, and the simultaneous solve means all the subspaces form a coherent unit.

Figure 4:
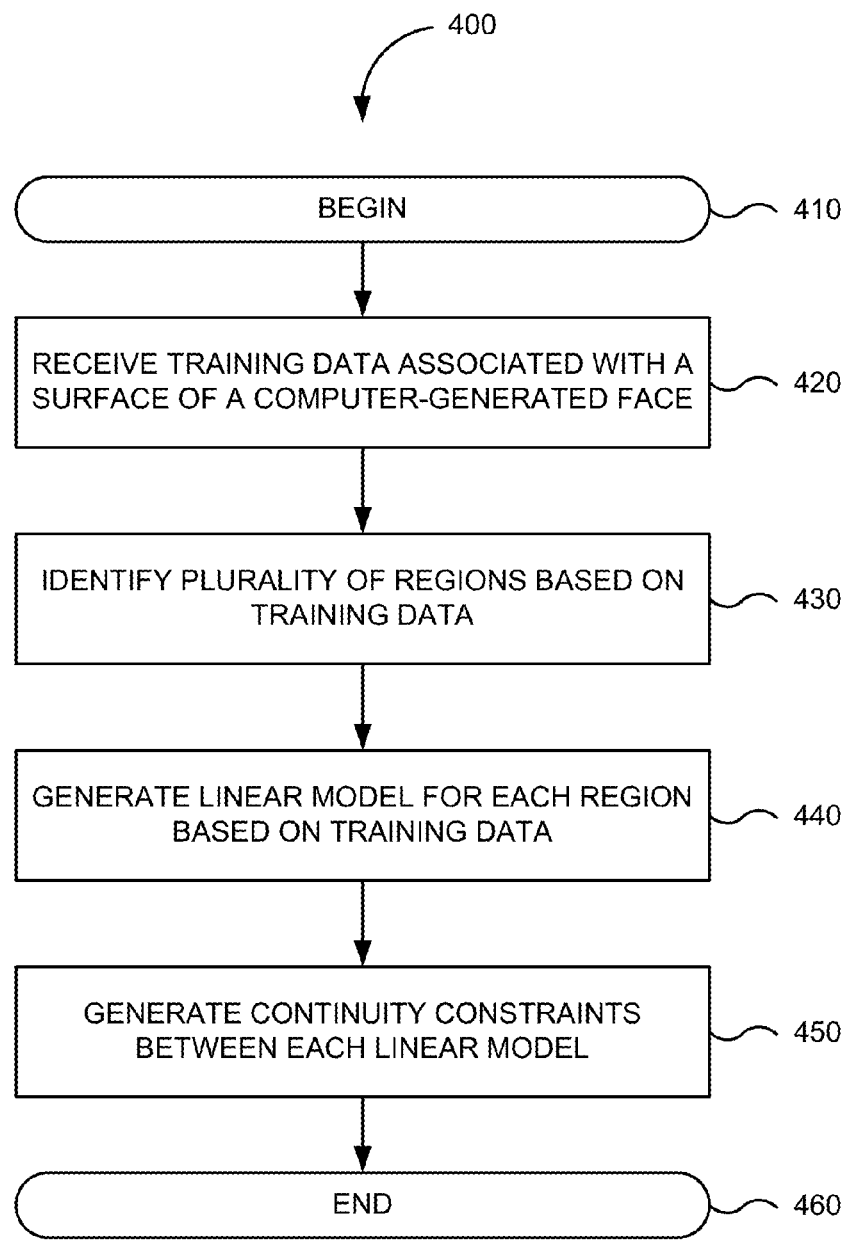
FIG. 4 is a flowchart of a method for creating interactive region-based linear models for the mesh of the computer-generated face of FIG. 2 in accordance with one embodiment.

FIG. 4 is a flowchart of method 400 for creating interactive region-based linear models for mesh 200 of the computer-generated face of FIG. 2 in accordance with one embodiment. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, training data associated with a surface of a computer-generated face is received. The training data may include time-based position information for all or part of the surface of the computer-generated face. The training data may be obtained from a variety of sources, such as manually generated, procedurally generated, from motion capture, or the like. In some embodiments, the training data may include one or more training poses for the surface of the computer-generate face. Each training pose may provide one or more examples of a behavior expected of the surface of the computer-generate face or of a portion of the surface of the computer-generated face.

Consider a linear model according to equation (1):

$$v=Bc \qquad (1)$$

where B are the model's linear basis, c are the model parameters and v is the data to be modeled (e.g., one or more manipulations of the surface of the computer-generated face). In one specific case of 3D faces, for example, v can be a column vector containing the (x, y, z) spatial coordinates of each of the vertices in a mesh (e.g., mesh 200) that represents the computer-generated face. The model parameters, c, that best describe the input data v, in a least squares sense can be found by minimizing equation (2):

$$E=\|v-Bc\|_2^2 \qquad (2)$$

Because equation (2) is a convex function, minimum can occur at the unique extreme where a derivative with respect to c vanishes as shown in equation (3):

$$B^TBc-B^Tv=0 \qquad (3)$$

which yields the closed form solution as shown in equation (4):

$$c=(B^TB)^{-1}B^Tv \qquad (4)$$

that reduces to $c=B^Tv$ if B is an orthonormal basis.

To create a region based face model in one embodiment, different sections of v can be independently modeled. Each section may contain a subset of the vertices that compose the full face.

Figure 5:
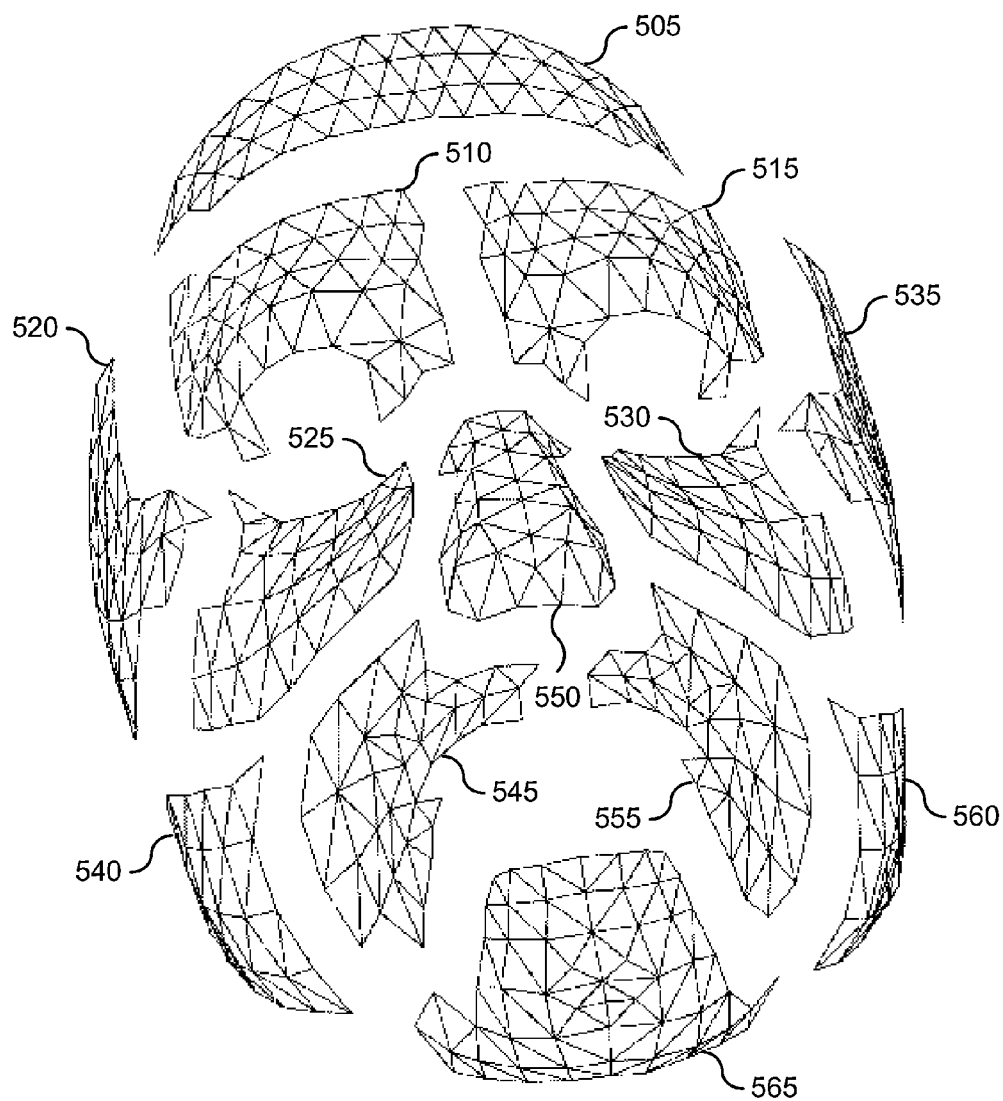
FIG. 5 is an illustration of the mesh of the computer-generated face of FIG. 2 having a plurality of interactive regions that may be used by the system of FIG. 1 in accordance with one embodiment.

In step 430, a plurality of regions are identified based on the training data. In various embodiments, each region may be determined using the same technique, such as clustering techniques on various affinity measures. Some examples of spectral clustering are discussed further below. In other embodiments, one or more regions may be determined using a different technique. FIG. 5 is an illustration of mesh 200 of the computer-generated face of FIG. 2 having a plurality of interactive regions that may be used by system 100 of FIG. 1 in accordance with one embodiment. In this example, mesh 200 includes regions 505, 510, 515, 520, 525, 530, 535, 540, 545, 550, 555, and 560.

Returning to FIG. 4, in step 440, a linear model is generated for each identified region based on the training data. Each linear model may represent behavior of the region as learned from the training data. In step 450, one or more continuity constraints are generated between each linear model. For example, soft constraints in region boundaries may be determined to connect regions that share boundaries. In one aspect, a shared boundary may include the sharing of at least one vertex between at least two regions. In another aspect, a shared boundary may include an overlap between at least two regions. Overlap may be minimal in that two or more vertices are shared or extensive in which substantially all of two regions overlap.

Continuing the previous example, one requirement for integrating the subsets may be that each shares at least one vertex with at least another region. The shared vertices are referred to herein as "boundary vertices". For a region based model with M regions, equation (2) can be replaced by equation (5):

$$E = \sum_{i=1}^{M} \|v^i - B^i c^i\|_2^2 \quad (5)$$

where $B^i$ are the bases of the $i^{th}$ model, which models the $i^{th}$ region $v^i \subset v$ with model coefficients $c^i$. However, regions of that share boundary vertices should remain consistent to satisfy continuity constraints, therefore equation (5) can be reformulated to enforce equality at the boundaries as shown in equation (6):

$$E = \sum_{i=1}^{M} \|v^i - B^i c^i\|_2^2 + \beta \sum_{i=1}^{M} \sum_{j=1}^{M} \|B_j^i c^i - B_i^j c^j\|_2^2 \quad (6)$$

where $B_j^i$ represents the elements of the $i^{th}$ basis that model the boundary vertices shared with the $j^{th}$ region. $\beta$ is a constant that weights the contribution of the boundary constraints to that of the reconstruction error. One solution to equation (6) may be found by finding the point $c^m = [c^1 c^2 \ldots c^M]^T$ at which the gradient vanishes. The gradient can be specified by the vector $[\partial E/\partial c_1; \ldots; \partial E/\partial c_M]^T$ with each partial derivative of equation (6) with respect to $c^i$ given by equation (7):

$$B^{i^T} B^i c^i - v^{i^T} B^i + \beta \sum_{j=1}^{M} (B_j^{i^T} B_j^i c^i - B_j^{i^T} B_i^j c^j) = 0 \quad (7)$$

Stacking the elements of the gradient forms a system of linear equations on $c^m$ which can be computed directly by solving the system of simultaneous equations. FIG. 4 ends in step 460.

Figure 6:
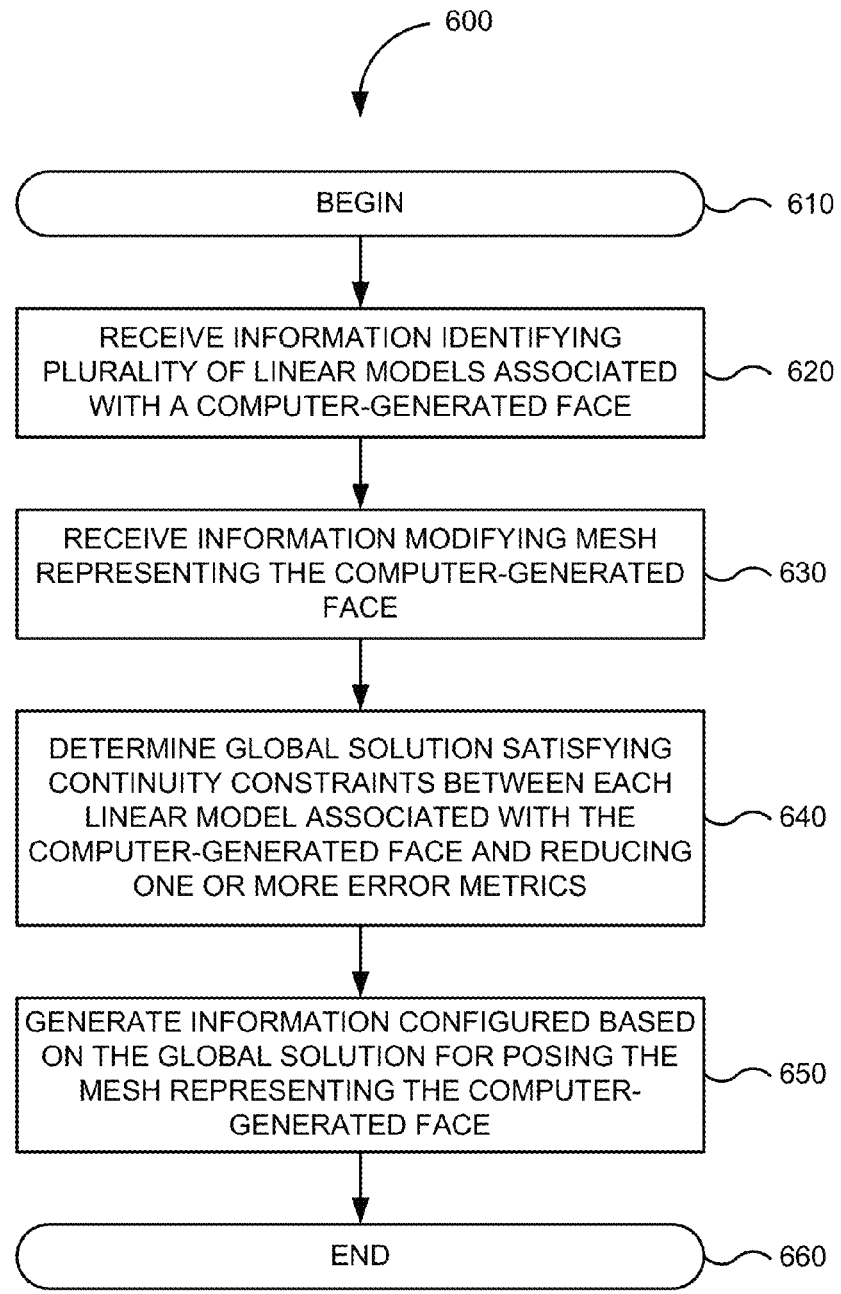
FIG. 6 is a flowchart of a method for posing a surface of a computer-generated face using interactive region-based linear models in accordance with one embodiment.

FIG. 6 is a flowchart of method 600 for posing a surface of a computer-generated face using interactive region-based linear models in accordance with one embodiment. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 600 depicted in FIG. 6 begins in step 610.

In step 620, information is received identifying a plurality of linear models associated with the computer-generated face. In various embodiments, each linear model represents behavior of a region of the computer-generated face. One or more of the linear models may be generated as discussed above with respect to FIG. 4.

In step 630, information modifying a mesh representing the computer-generated face is received. For example, a user may manipulate vertices, parameters, or control points associated with mesh 200. In further embodiments, one or more portions of an animation cue may be procedurally generated to provide values over time for controls or avars associated with a surface of a computer-generated face. In other embodiments, one or more data sets may be provided onto which a surface of a computer-generated face is to be mapped.

In various embodiment, system 100 provides click and drag interaction, in which the user is allowed to manipulate elements of a surface of a face model and constrain them to a desired location. More generally, the user may decide to constrain one, several, all or no vertices at all; the approach is not limited by the number of user given constraints.

In step 640, a global solution is determined that satisfies continuity constraints between each linear model associated with the computer-generated face and reducing one or more error metrics. As discussed above, stacking the elements of the gradient forms a system of linear equations on cm which can be computed directly by solving the system of simultaneous equations.

Consider the case of a single model for which the user has provided constraints for all vertices. Equation (2) exemplifies this case, and equation (4) provides the solution. If the number of user-given constraints falls beneath the number of the model's bases (which determines the degrees of freedom), the model system becomes underconstrained.

This problem is addressed by also constraining the global solution to reduce one or more error metrics. For example, to minimize the distance traveled in parameter space to reach the solution as shown in equation (8):

$$E = \sum_{k=1}^{K} \|v_k - B_k c\|_2^2 + \gamma \|c_0 - c\|_2^2 \quad (8)$$

where $v_k$ is the $k^{th}$ user-given constraint, $B_k$ are the corresponding basis, and $c_0$ is the model's parameters before the vertex constraints were given.

For region-based models according to techniques of this disclosure, equation (8) can be extended to each of multiple sub-models and border constraints are incorporated as shown in equation (9):

$$E = \sum_{i=1}^{M} \sum_{k=1}^{K} \|v_k^i - B_k^i c^i\|_2^2 + \beta \sum_{i=1}^{M} \sum_{j=1}^{M} \|B_j^i c^i - B_i^j c^j\|_2^2 + \gamma \sum_{i=1}^{M} \|c_0^i - c^i\|_2^2 \quad (9)$$

where $v_i$ is the $k^{th}$ user-given constraint for the $i^{th}$ model, $B_k^i$ is the corresponding basis, and $c_0^i$ is the initial model parameters of the $i^{th}$ model.

The second and third term of equation (9) regulate the coupling between regions. High values of $\beta$ combined with low values of γ increase coupling, which means that constraints in one sub-model will strongly impact other sub-models (see FIG. 13C). An opposite ratio of β and γ produce more independent sub-models at the cost of greater boundary discrepancies (see FIG. 13B). Notice that as β and γ approach zero, the region-based model becomes a collection of totally independent models described by equation (2). Conversely as they become larger, the model becomes rigid. In contrast to Lewis and Anjyo [15], who solve equation (8) as a quadratic program, equation 9 can be solved differently by finding the point at which the gradient vanishes. The partial derivative of equation (9) with respect to $c^i$ is shown in equation (10):

$$\sum_{k=1}^{K}\left(B_k^{iT}B_k^i c^i - v_k^{iT}B_k^i\right) + \beta\sum_{j=1}^{M}\left(B_j^{iT}B_j^i c^i - B_j^{iT}B_i^j c^j\right) + \gamma(c^i - c_0^i) = 0 \quad (10)$$

Stacking the elements of the gradient forms a system of linear equations on cm which can be solved directly by solving the system of simultaneous equations. Accordingly, in step 650, information is generated that is configured based on the global solution for posing the mesh representing the computer-generated face. FIG. 6 ends in step 660.

FIG. 7A is an illustration depicting mesh 700 of a computer generated face associated with a plurality of region-based linear models (represented by different shaded regions) together with one or more manipulations that may be performed with respect to the eyes and mouth in accordance with one embodiment. In this example, certain control points associated with mesh 700 in the area of the eyes and mouth (e.g., a portion representing the eye brows and the left mouth corner) are dragged to create a wink and a smirk. Specifically, a user may specify that control points 710 (e.g., points controlling a portion of mesh 700 representing the eye lids and mouth corners) are to be moved from a first location (e.g., represented by a dark shaded circle) to or toward a second location (e.g., represented by a larger lighter shaded circle).

FIG. 7B is an illustration depicting one or more deformations made by system 100 of FIG. 1 to mesh 700 of the computer-generated face of FIG. 7A when using a region-based approach such that the one or more manipulations that may be performed with respect to eyes and mouth do not cause undesired effects in the rest of the facial model in accordance with one embodiment. In this example, a region-based approach imputes the full face preserving global features. Notice how the configuration of the computer-generated face is preserved in areas 720 and 730.

Figure 8B:
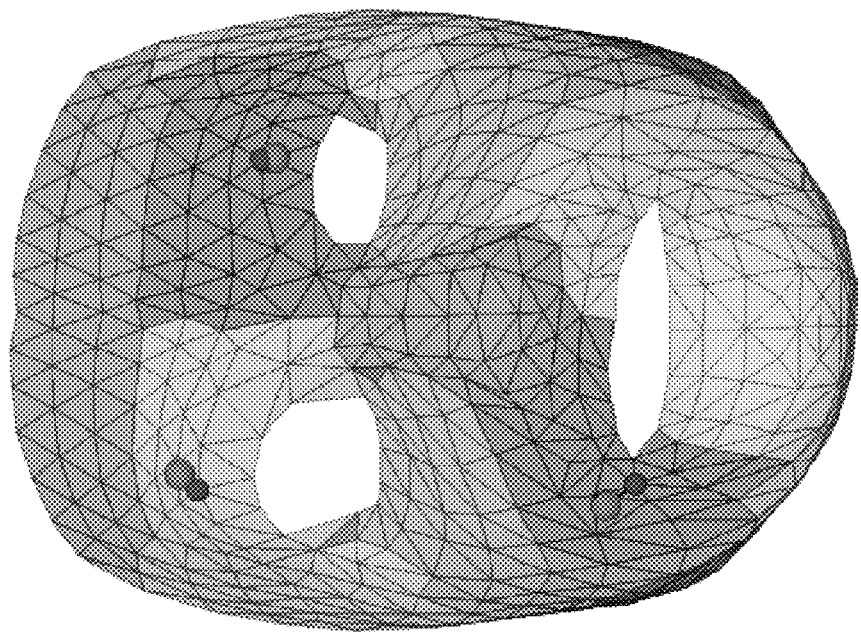
FIGS. 8A and 8B are illustrations depicting one or more differences between the one or more deformations made by the system of FIG. 1 to the mesh of the computer-generated face of FIG. 2 when using a holistic approach and the one or more deformations made by the system of FIG. 1 to the mesh of the computer-generated face of FIG. 7A when using a region-based approach in accordance with one embodiment.
Figure 8A:
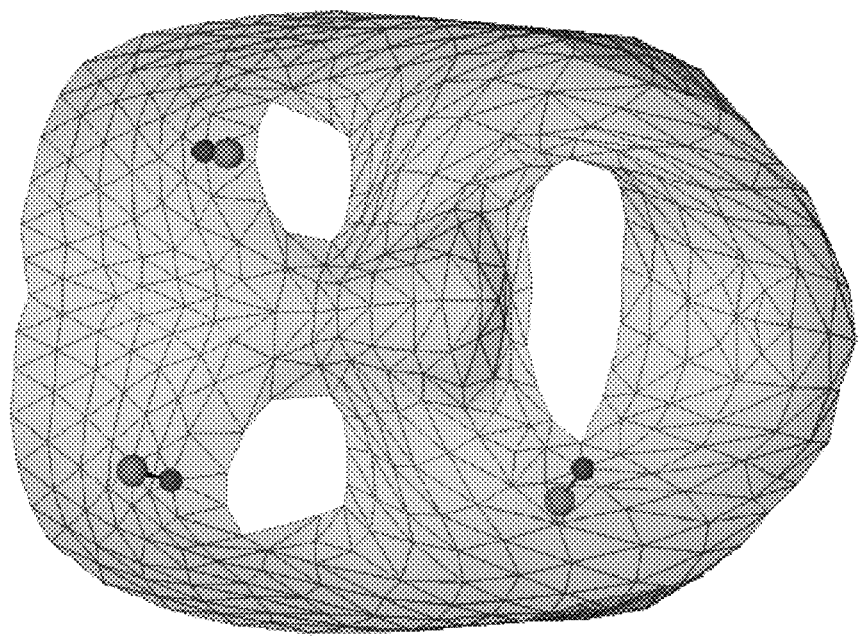

FIGS. 8A and 8B are illustrations depicting one or more differences between the one or more deformations made by system 100 of FIG. 1 to mesh 200 of the computer-generated face of FIG. 2 when using a holistic approach and the one or more deformations made by system 100 of FIG. 1 to mesh 700 of the computer-generated face of FIG. 7A when using a region-based approach in accordance with one embodiment. In this example, using a holistic model results in deformation of the whole face in face mesh 200 while imputation using the region-based approach produces a wink and a smirk in mesh 700.

Facial Motion Capture Data

The region-based linear model formulation described herein was applied to the problem of modeling dense face motion capture data. For this purpose, a database that includes captures from four different individuals, three professional actors and one art student, was collected. The subjects covered both genders, two ethnicities, and a broad age spectrum. The subjects are referred to hereinafter as M1 (male 1), M2 (male 2), F1 (female 1) and F2 (female 2).

Each subject performed 18 sentences. Prior to the recording of each sentence, the actor was given a background story to provide the inspiration for an emotional performance. All actors performed the same sentences with the same emotional background. The emotions the actors performed were pride, rage and contempt.

The data was split in training and test sets for each actor. The training sets contained four sentences from each emotion, while the test sets contained two per emotion. Actors wore 3 mm reflective markers spaced approximately 1 cm apart and were recorded using a commercial motion capture system at 120 frames per second (fps). For actor M1, a range of motion session was also collected. During this session, the actor was asked to move his face in a random fashion to achieve extreme expressions. An additional 86 sequences performing different isolated and combinations of facial action coding system (FACS) units as described by Ekman and Friesen [10] were also collected for M1.

The creation of linear models that span the data of multiple people requires establishing dense point-to-point correspondences across the data set. This means that the position of each vertex may vary in different samples, but its context label should remain the same. During capture, the actors had different numbers of reflective markers depending on the dimensions of their faces. Additionally, no two actors had an identical marker configuration. To establish dense correspondence, a dense 3D generic mesh template with 8820 vertices was fitted to the entire motion capture database using the method by Tena et al. [24].

The fitted dense meshes are then uniformly subsampled down to a consistent 397 vertices, providing a data set of 3D meshes that are in full dense correspondence. Finally, rigid-body transformations are removed from the data by aligning each motion capture frame to the subsampled generic mesh template using ordinary procrustes analysis [8].

Automatic Face Region Determination

In some embodiments, system 100 provides regions of the face that are highly correlated, but also connected and compact. Regions that are correlated will be compressed more by PCA. To find the regions, the full data set from M1, which included the range of motion, emotional speech and FACS units, is used. The data is subsampled to 15 fps to reduce redundancy, after which the data set consists of 4787 samples.

The data's normalized correlation matrix is computed. The correlation matrix is of dimensionality 3N×3N, N being the number of vertices, and expresses the correlations between each coordinate of each vertex. To obtain a measure of how each vertex correlates with each other rather than the correlation between the x-y-z coordinates, three N×N sub-matrices containing only the correlation of the x, y, and z coordinates respectively are created. The mean of the three submatrices, C, is computed to obtain a metric that measures the degree at which vertices move in the same direction. Vertices in the same region should not only be correlated, but also close to each other on the face surface. Accordingly, the inter-vertex distances on the mesh as described for the isomap algorithm [25] are computed to form the N×N matrix G. In order to combine the correlation metric with the mesh-distance metric, the latter is normalized to the [0, 1] interval as shown in equation (11):

$$G_n = e^{-G/r} \quad (11)$$

where r controls how rapidly $G_n$ decreases as mesh distance increases. Both metrics are added in a weighted manner into an affinity matrix as shown in equation (12):

$$A = \lambda C + (1-\lambda) G_n \quad (12)$$

where the weight $\lambda$ controls the relative importance of the intervertex correlation and distance on the mesh. To emphasize correlation over mesh distance $\lambda=0.7$. The values of $\lambda$ and r can be adjusted depending on the desired regions. For these experiments, r=10 (at this value $G_n$ approaches zero for mesh distances greater than 50 mm) and $\lambda=0.7$ to emphasize correlation over mesh distance. Additionally, prior to calculating A, C was thresholded at 0.7 to obtain regions with high correlation values.

Figure 9A:
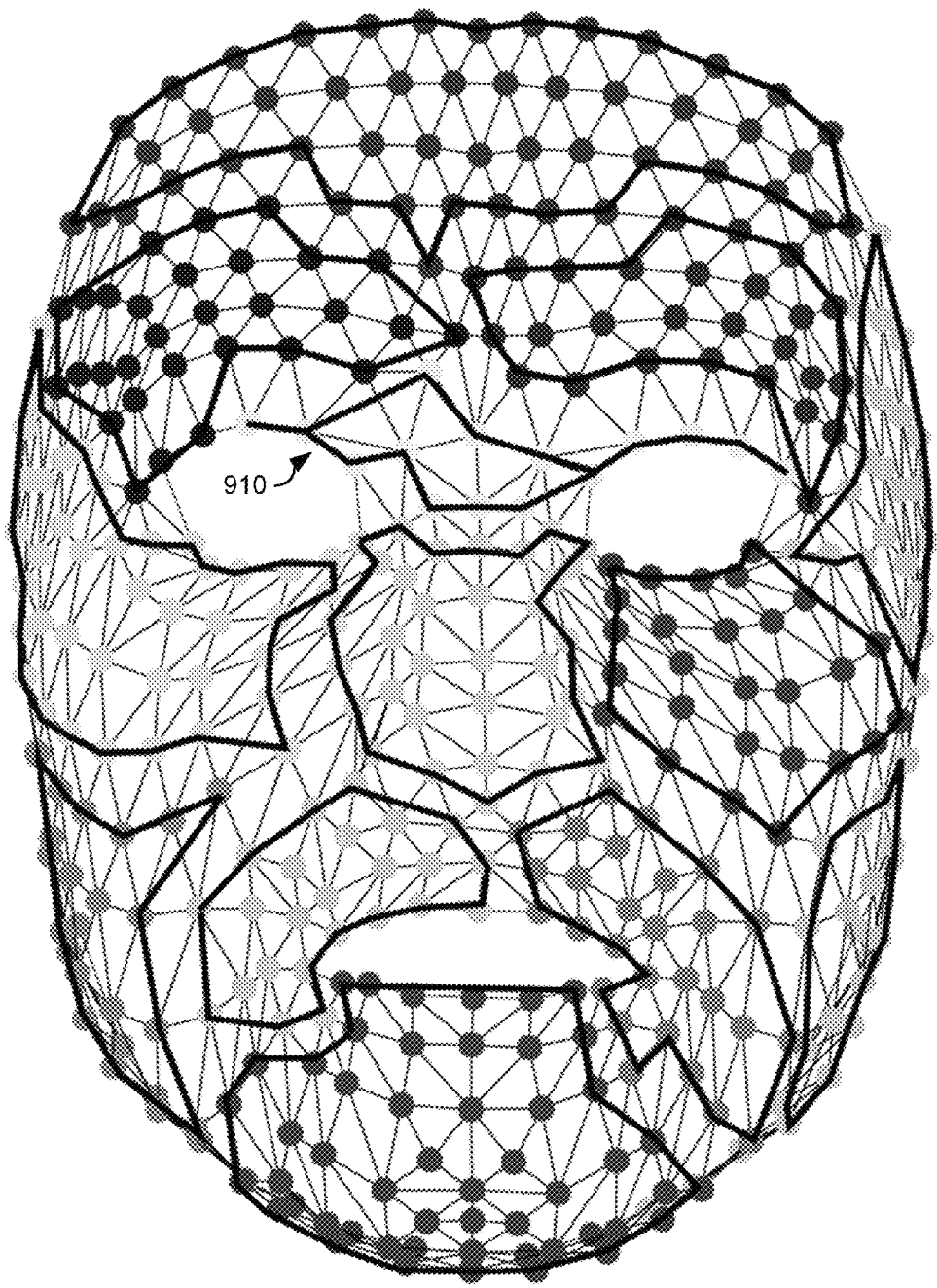
FIGS. 9A, 9B, and 9C are illustrations depicting results of spectral clustering with different distance metrics to automatically find regions for region-based linear models in various embodiments.
Figure 9B:
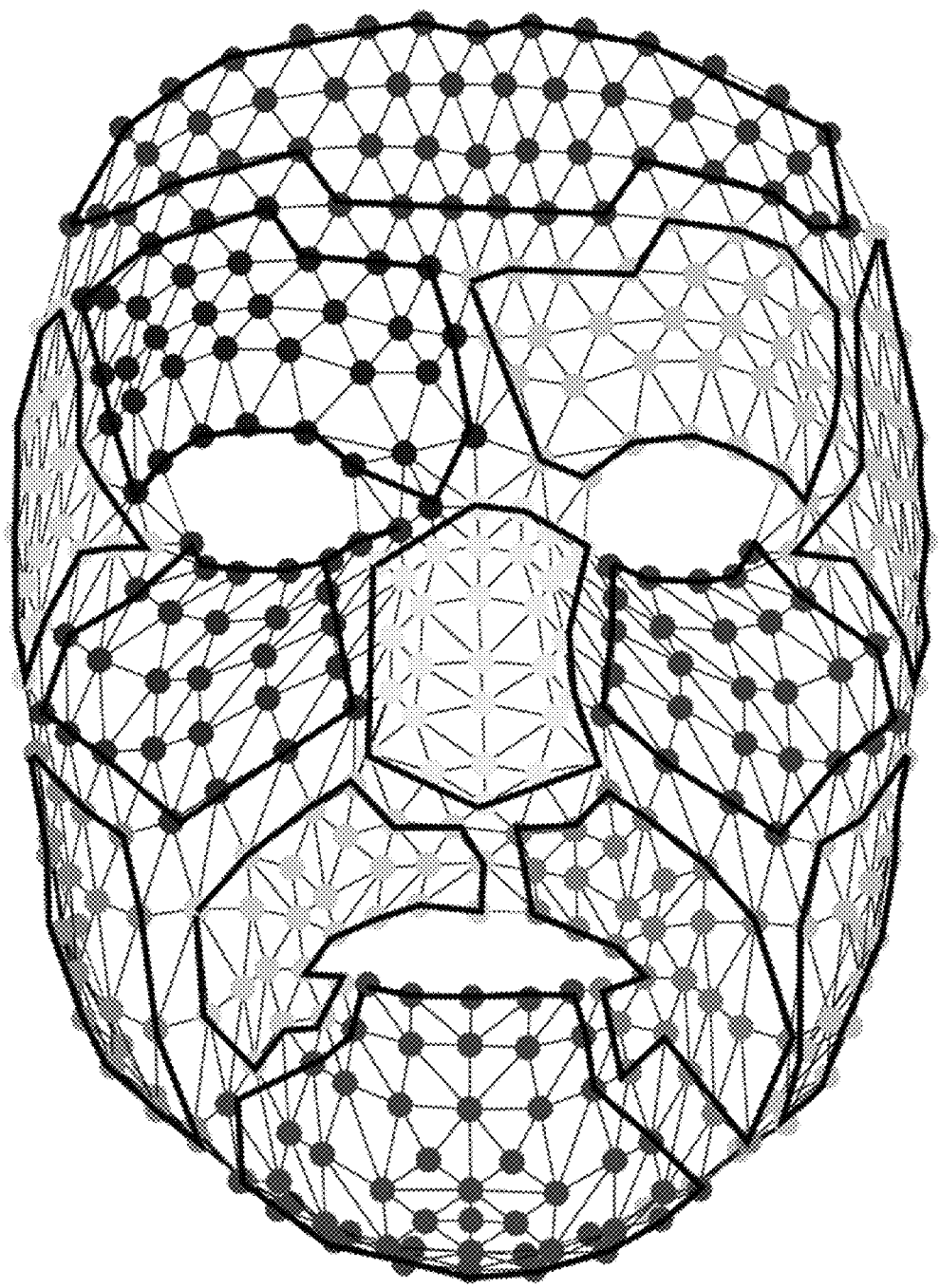
Figure 9C:
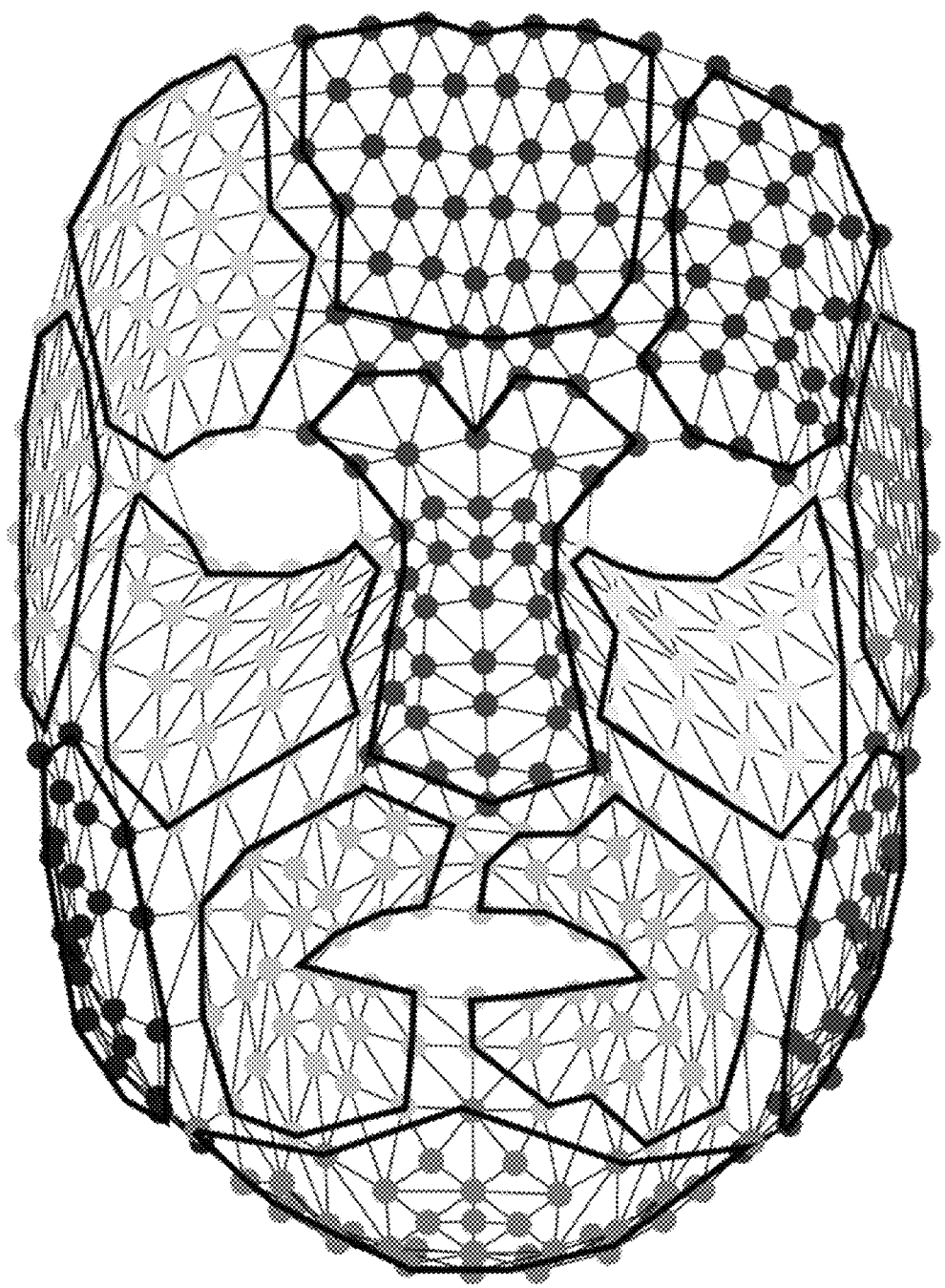

In various embodiments, system 100 may perform spectral clustering on affinity matrix A, as described by Ng et al. [18], starting with two clusters and continuing to add more until a cluster whose vertices cannot be triangulated is created. In one example, a maximum of 13 compact regions were obtained. FIGS. 9A, 9B and 9C show the clustering results on M1's motion capture data using affinity matrices C, A, and $G_n$ respectively. FIGS. 9A, 9B, and 9C are illustrations depicting results of spectral clustering with different distance metrics to automatically find regions for region-based linear models in various embodiments.

FIG. 9A is an illustration of mesh 700 of the computer-generated face of FIG. 7A depicting results using correlation as distance metric. FIG. 9B is an illustration of mesh 700 of the computer-generated face of FIG. 7A depicting results using a combination of correlation and distance on the mesh. FIG. 9C is an illustration of mesh 700 of the computer-generated face of FIG. 7A depicting results using distance on the mesh only.

Notice that the clustering results for A and C are very similar, as intended by the choice of $\lambda$. However, for 13 clusters, C produces a non-compact cluster (e.g., cluster 910), while A still produces compact clusters. Matrix $G_n$ produces only compact clusters, which makes up for the difference in results between C and A for 13 clusters. Also, notice that the regions obtained with C and A are nearly symmetric.

After segmentation, continuity constraints may be defined. For example, boundary vertices that are shared between different regions may be manually defined.

Results

To test how the region-based model generalizes to unseen data and across multiple identities, a PCA region based model and a holistic PCA model were built from our emotional speech motion capture data. For the region-based model, the face was split into the 13 regions obtained by spectral clustering as previously described. Each region was trained independently to produce its own subspace. The experiment begins by training the holistic and region-based models only with the training set from individual M1, reconstructing each of the four available test sets (M1, F1, M2 and F2), and measuring the reconstruction error as more principal components are added to the model. The region-based and holistic PCA models are then retrained using the combined training sets of M1 and F1, and tested again on each of the four test sets. The process is repeated adding M2's training set, and finally that of F2.

The reconstruction error reported is the root mean squared error per vertex calculated as $$E_{RMS} = \sqrt{\frac{1}{F}\sum_{i=1}^{F}\frac{1}{N}\|x^i - \hat{x}^i\|^2} \quad (13)$$

where F is the number of frames in the test set, N is the number of vertices, $x^i$ is the $i^{th}$ frame of the test set, and $\hat{x}^i$ is its reconstructed counterpart. Because the experiment was aimed at reconstructing data from multiple identities, the PCA models were trained and tested with zero mean data. This was achieved by subtracting the corresponding neutral pose from the training and test set of each individual. In practice, this means that the models learn the space of facial deformation without including the variation due to identity. However, the correct mean (neutral pose) is added during reconstruction to reflect the correct identity.

Figure 10A:
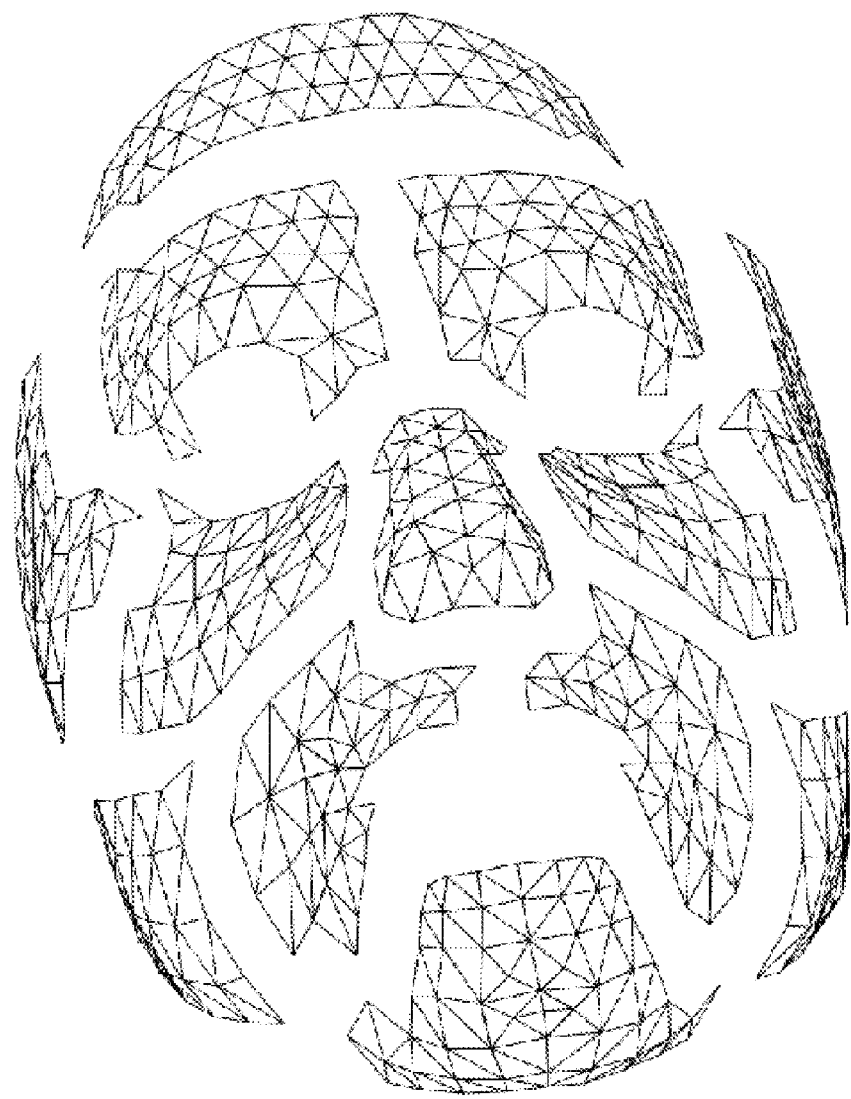
FIGS. 10AA, 10AB, 10AC, and 10AD are illustrations depicting the mean and the first 3 principal components as vector fields for each region of the mesh of the computer-generated face of FIG. 7A.
Figure 10A:
Figure 10A:
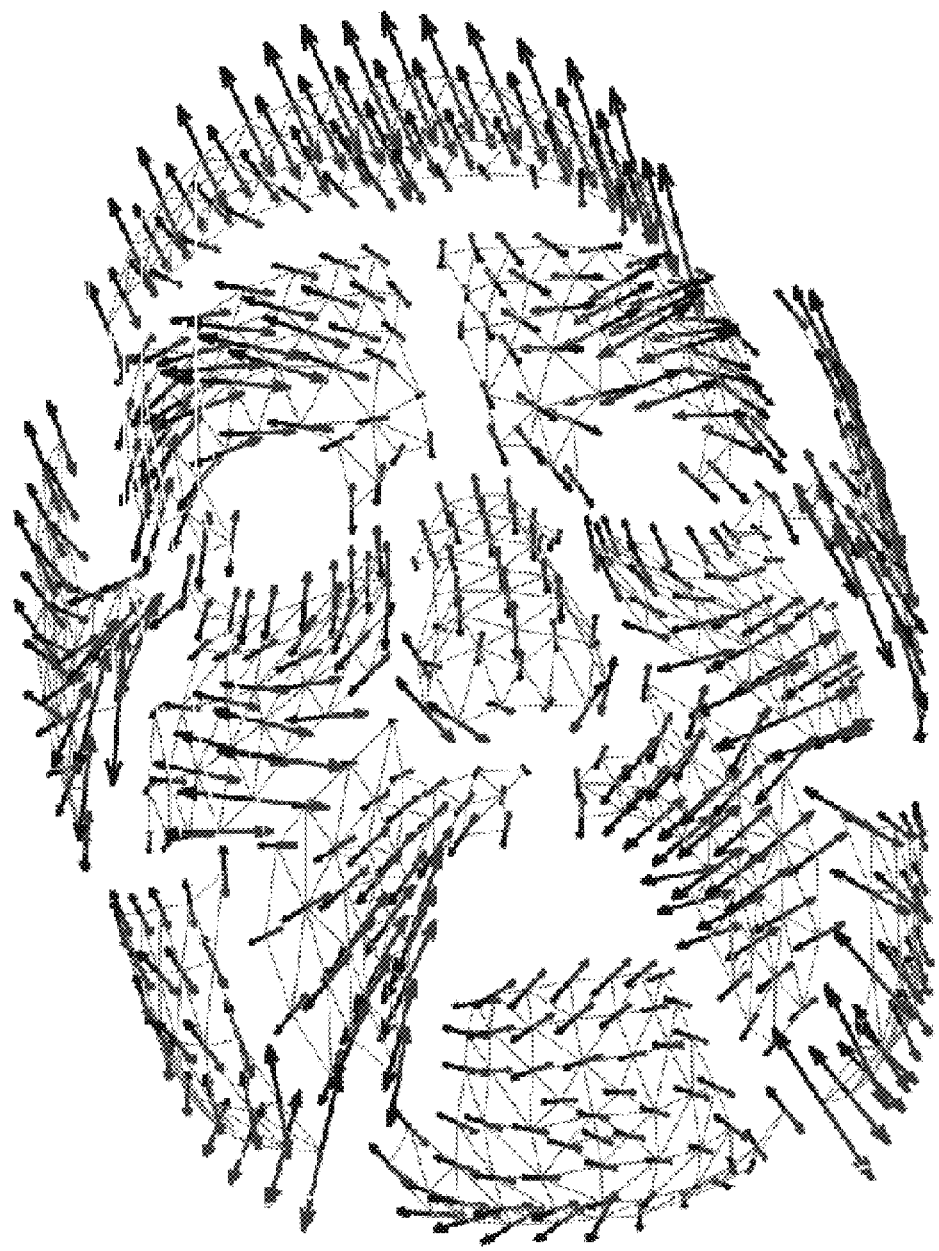
Figure 10A:
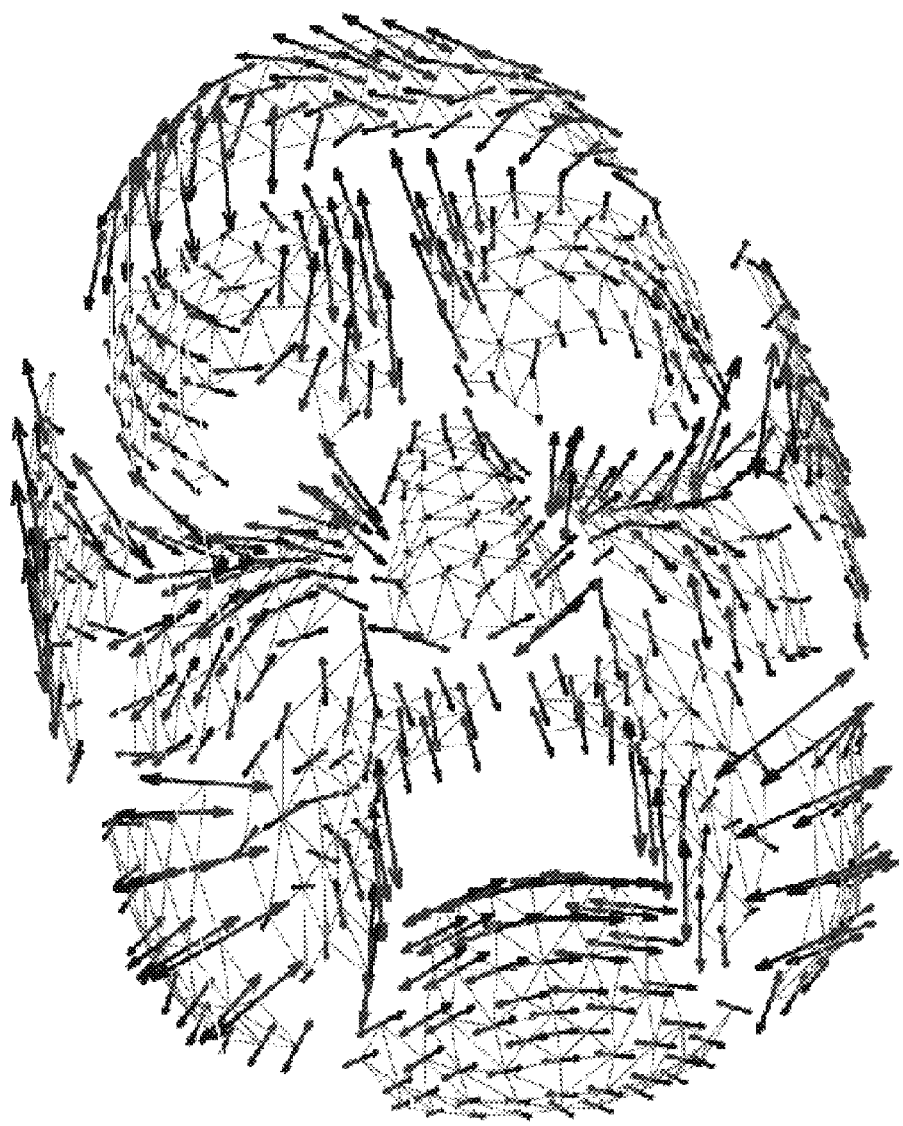

FIGS. 10AA, 10AB, 10AC, and 10AD are illustrations depicting for region-based linear models the mean and the first 3 principal components as vector fields for each region of mesh 700 of the computer-generated face of FIG. 7A.

Figure 10B:
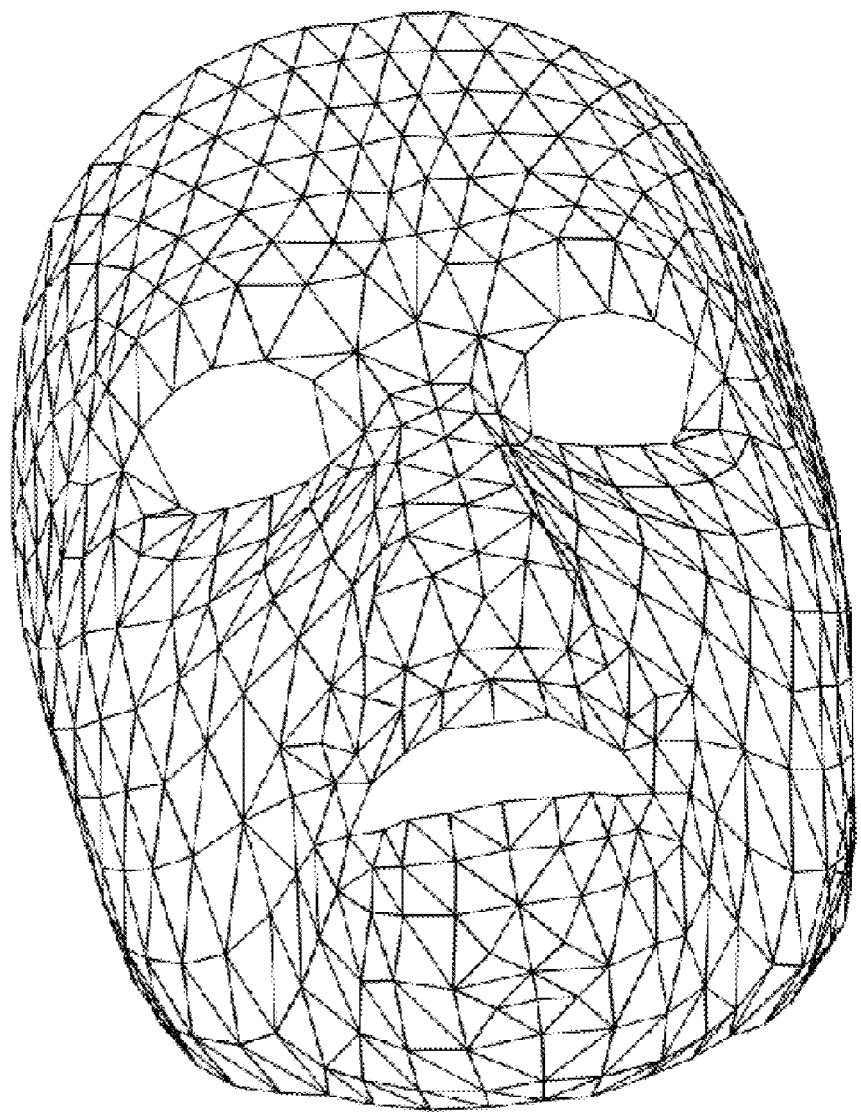
FIGS. 10BA, 10BB, 10BC, and 10BD are illustrations depicting the mean and the first 3 principal components as vector fields for the mesh of the computer-generated face of FIG. 2.
Figure 10B:
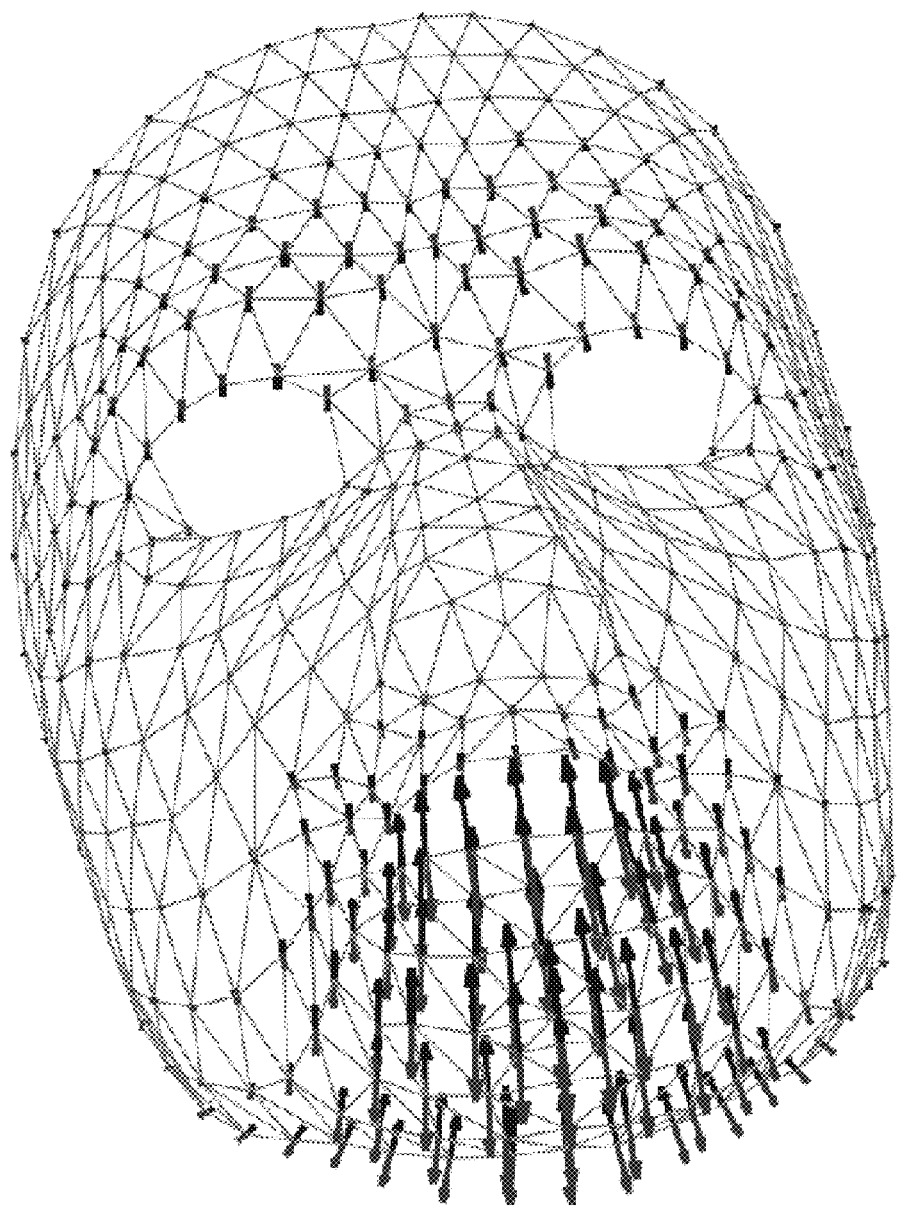
Figure 10B:
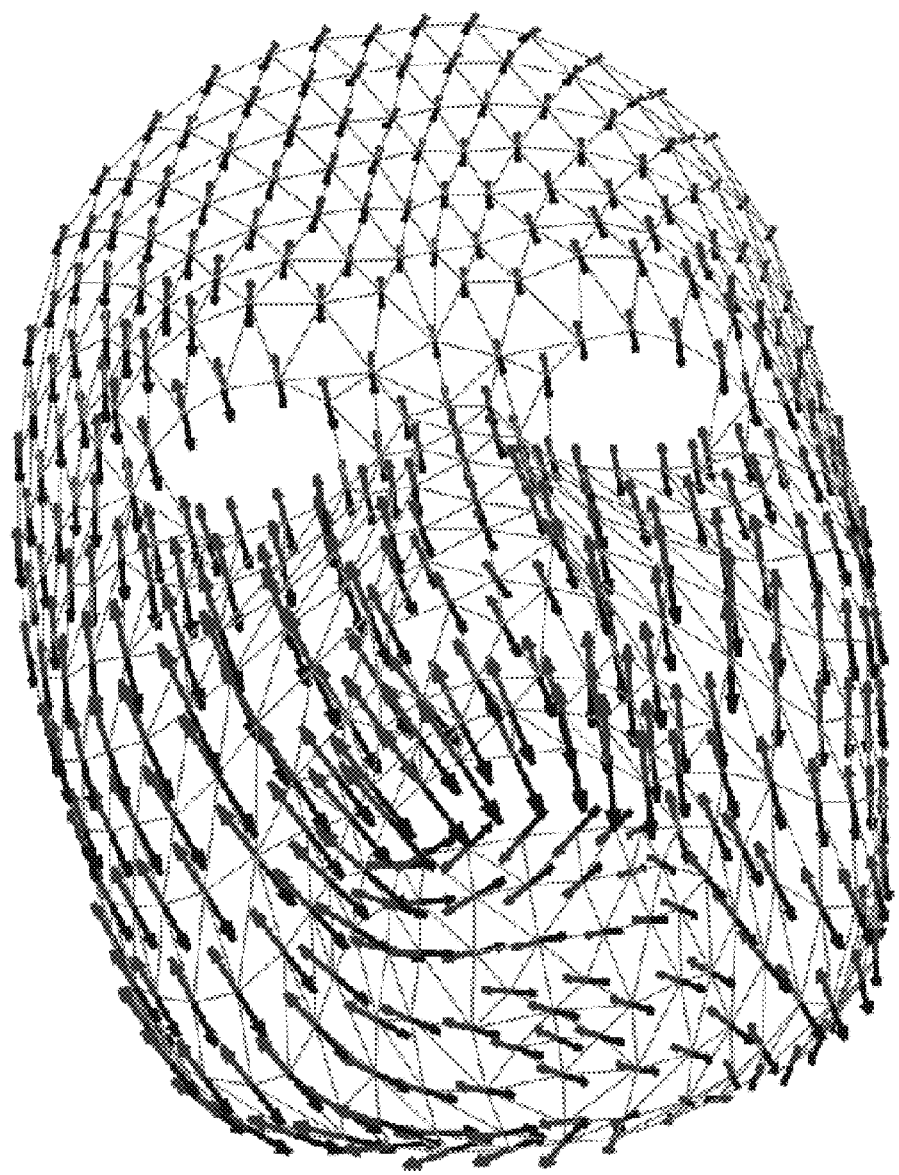
Figure 10B:
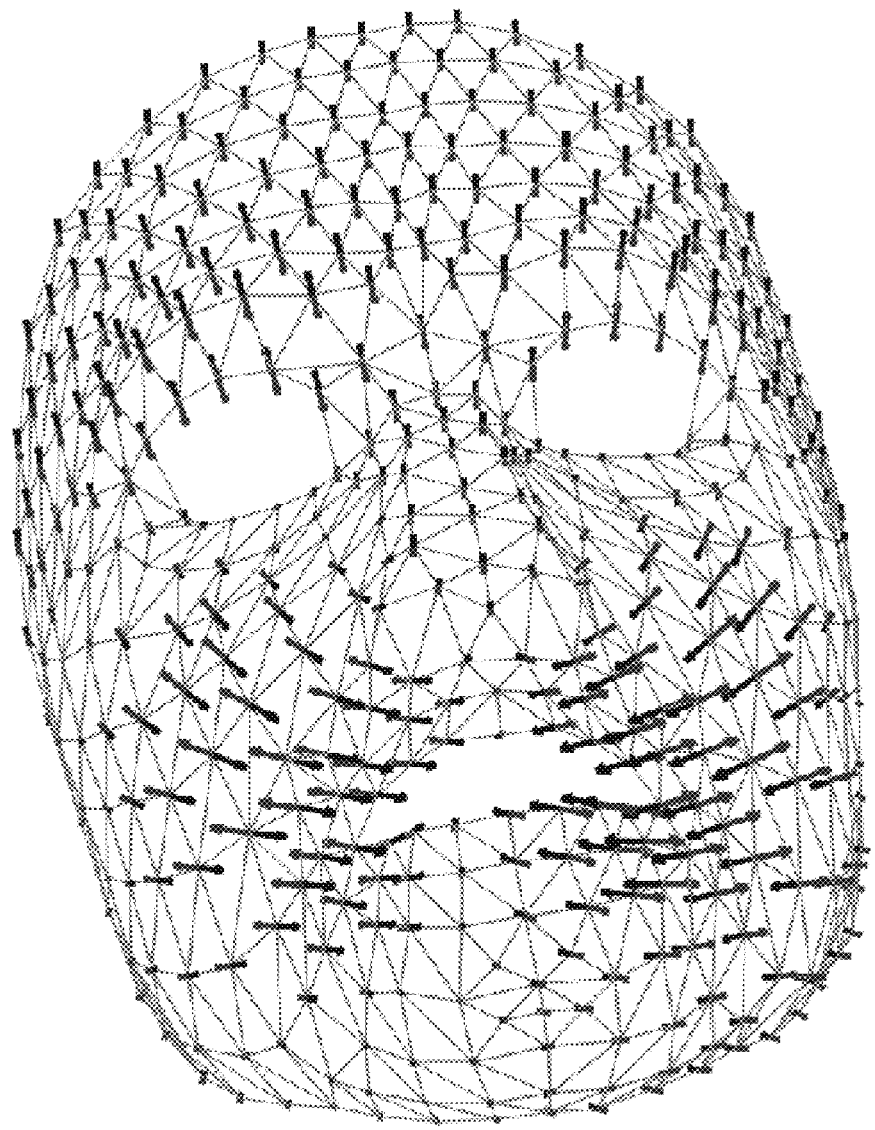

FIGS. 10BA, 10BB, 10BC, and 10BD are illustrations depicting for holistic models the mean and the first 3 principal components as vector fields for mesh 200 of the computer-generated face of FIG. 2.

Figure 11A:
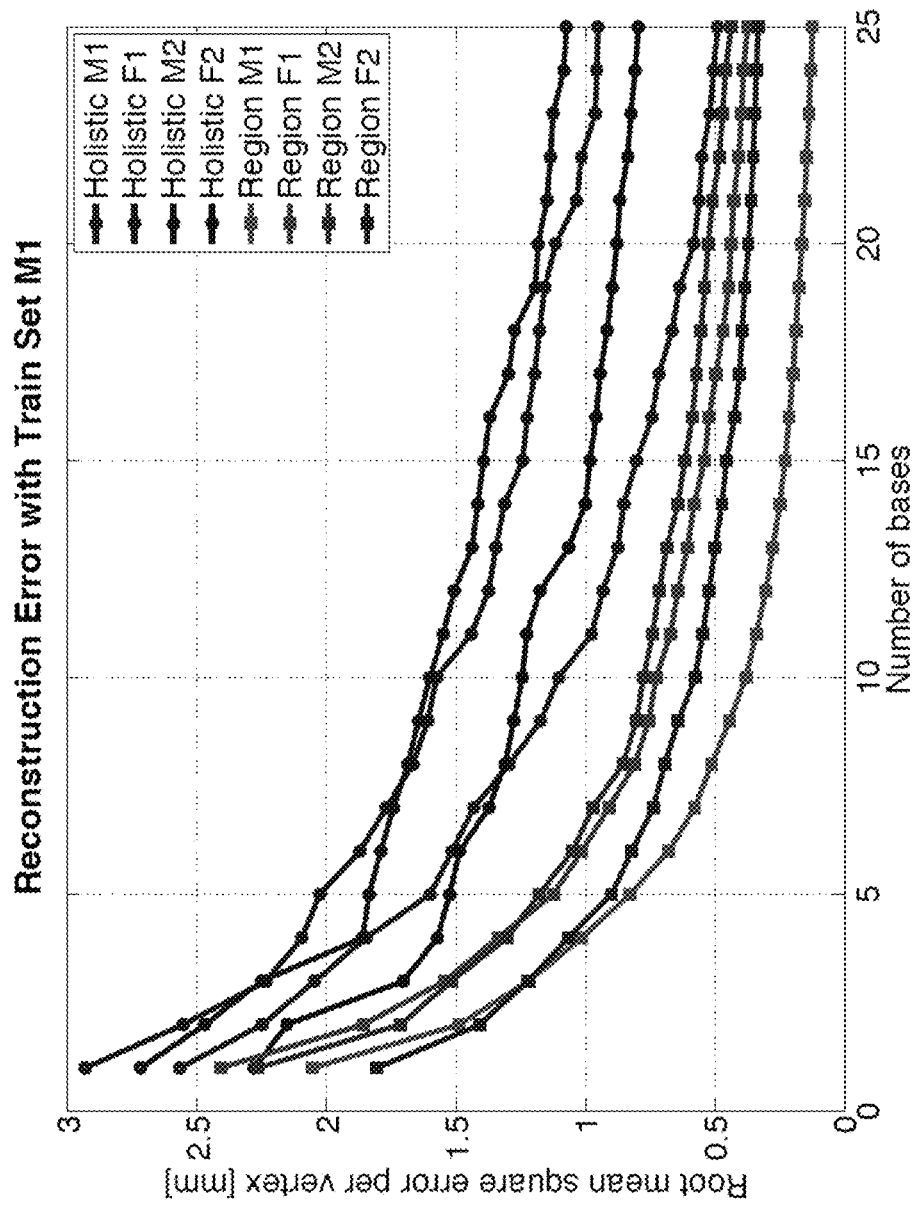
FIGS. 11A, 11B, 11C, and 11D are graphs depicting differences in reconstruction error between holistic models and region-based linear models created using techniques of this disclosure.
Figure 11B:
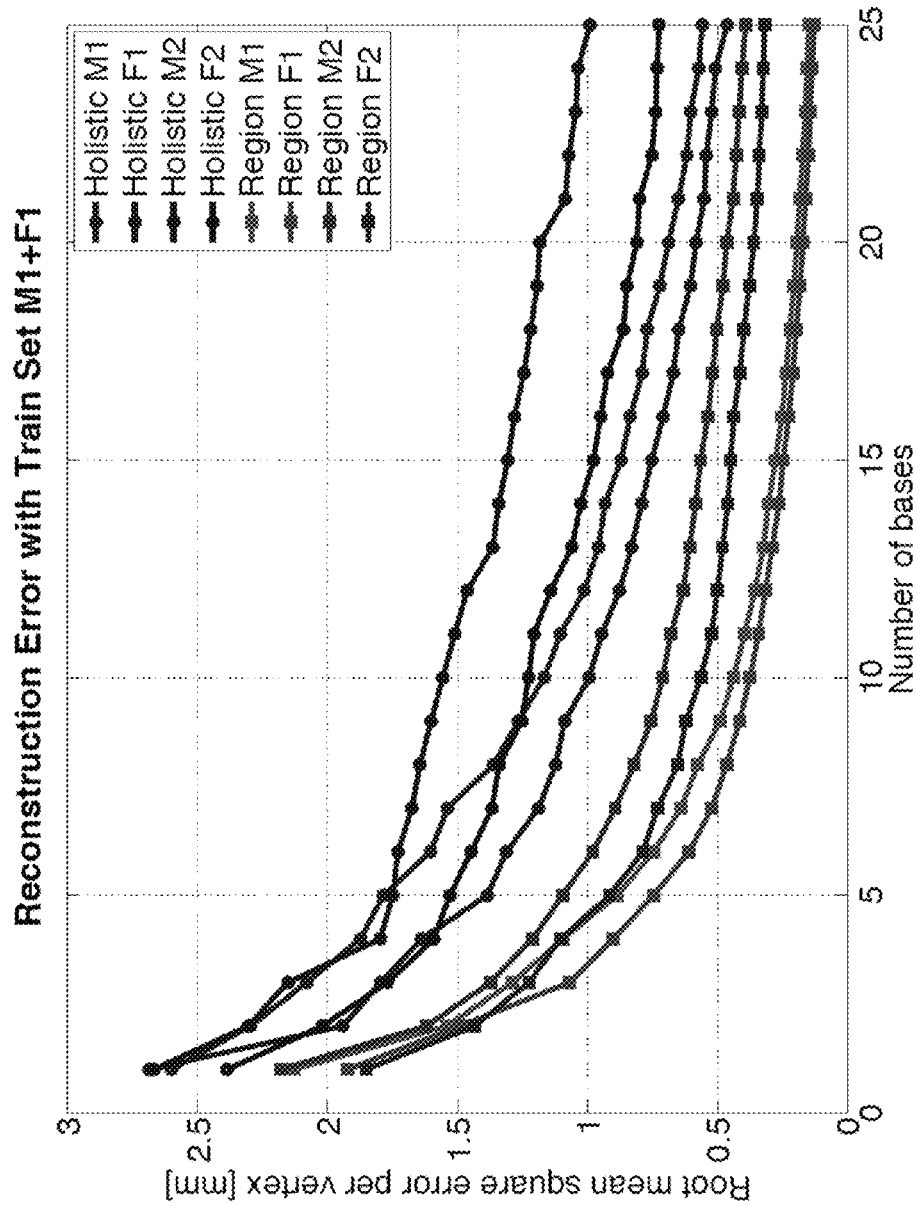
Figure 11C:
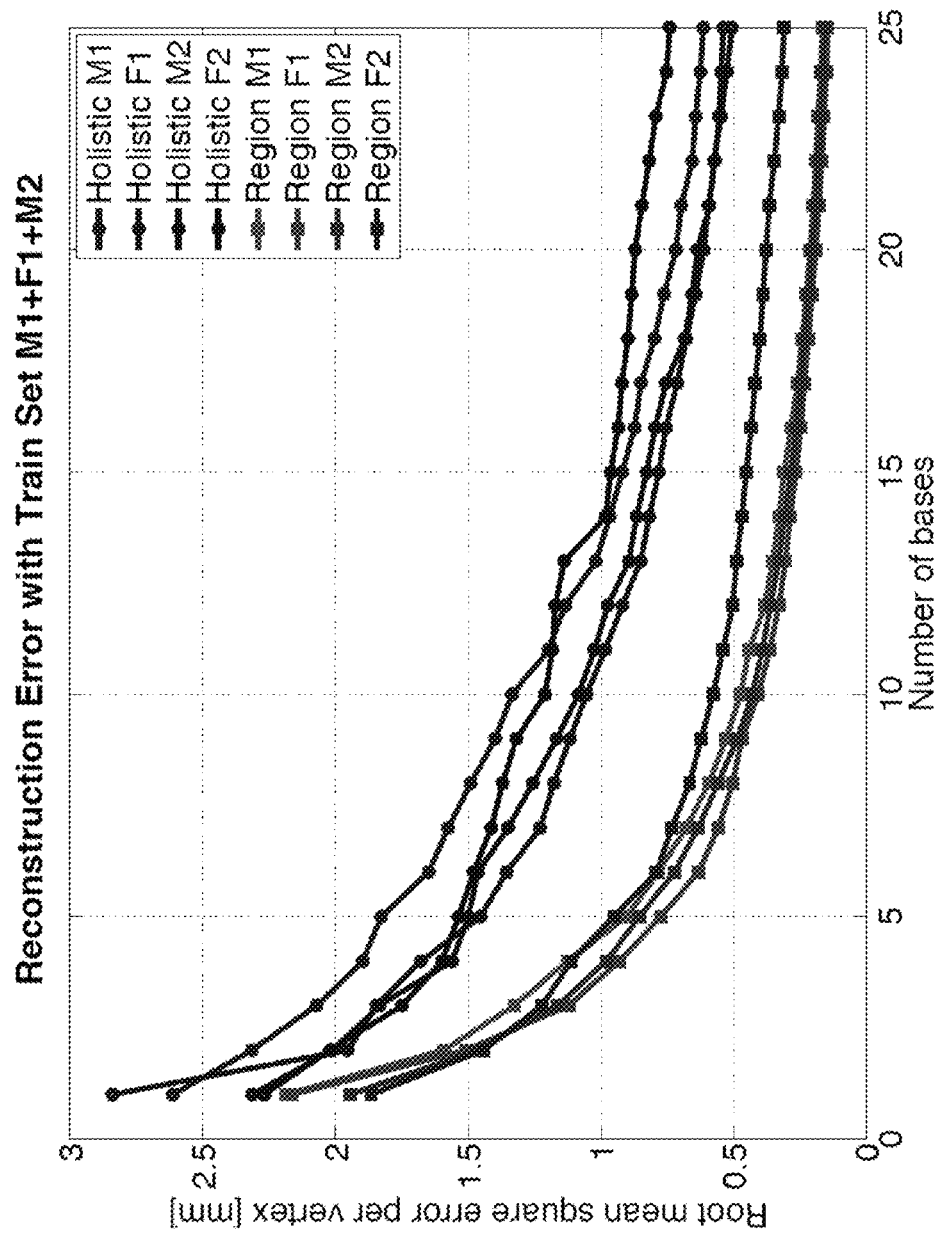
Figure 11D:
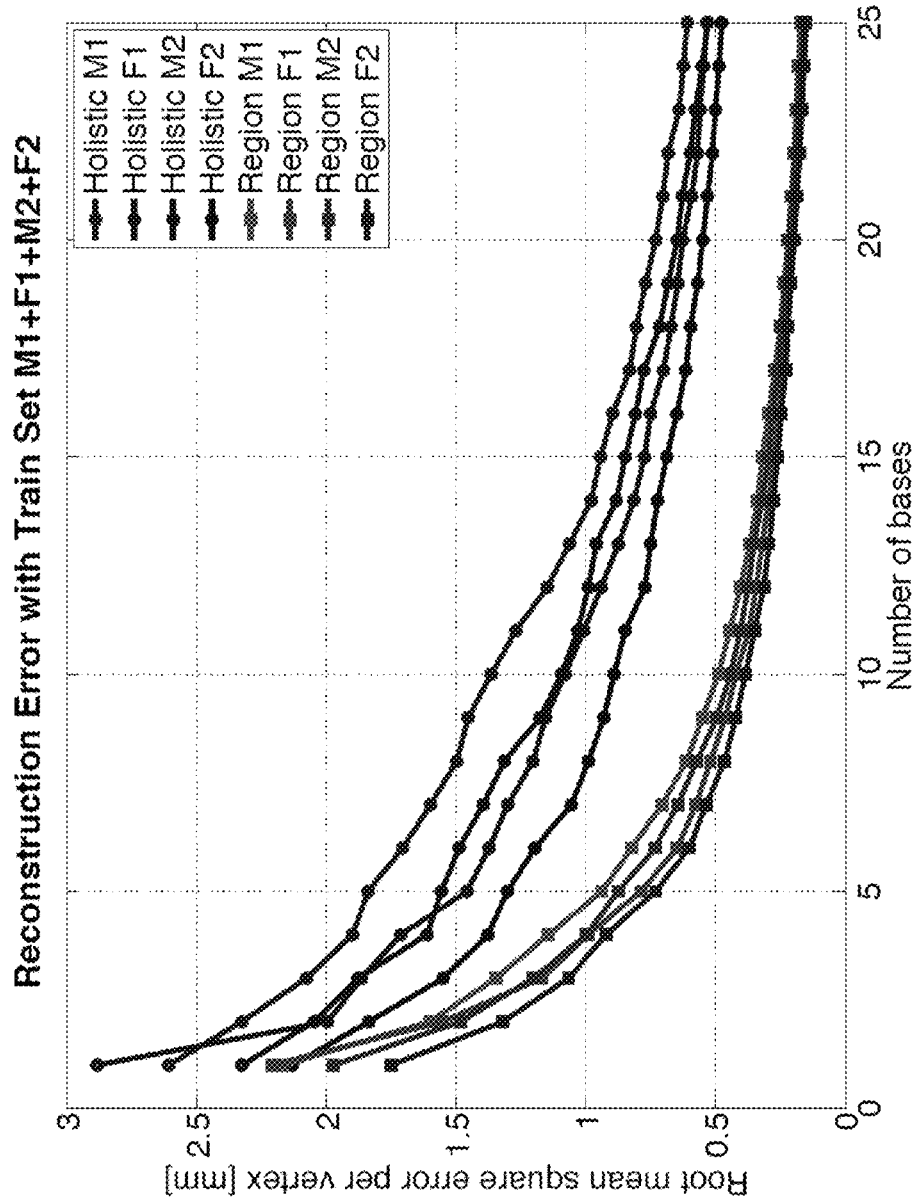

FIGS. 11A, 11B, 11C, and 11D are graphs depicting differences in reconstruction error between holistic models and region-based linear models created using techniques of this disclosure. The horizontal axes shows the number of principal components retained for each sub-model and for the holistic model. FIG. 11A shows the extreme case in which the models are trained with the data from M1 only. There are two significant facts to be noticed. First, the reconstruction error achieved for the test set of M1 with the region based model is lower than that attained by the holistic model. This shows the region-based model generalizes better to unseen data from the same individual. Second, there is less variance on the error obtained across individuals, showing that the region-based model generalizes better to multiple identities. FIGS. 11B, 11C, and 11D, show the error progression as more data is added to the training set.

Application to Face Posing and Animation

The mathematical formulation presented herein allows the user to constrain one, multiple, all, or none of the vertices of the model's face mesh. The model's equation finds the best solution, in a soft least mean squares sense, that satisfies the user-provided constraints (e.g., an input data set) and the continuity constraints associated with regions of the model (e.g., boundary constraints and parameter space constraints being the last two terms in equation (10)). The user can produce different model behaviors by adjusting its intrinsic parameters $\beta$ (boundary strength) and $\gamma$ (rigidity). In one aspect, a high value of $\beta$ combined with low $\gamma$ produces holistic behavior by enforcing boundary consistency and freeing changes in the local parameter space. Relaxing the boundary strength while increasing rigidity allows to mold the face model without the use of constraints because the local sub-models compromise their boundaries in the interest of maintaining their current configuration.

Figure 12:
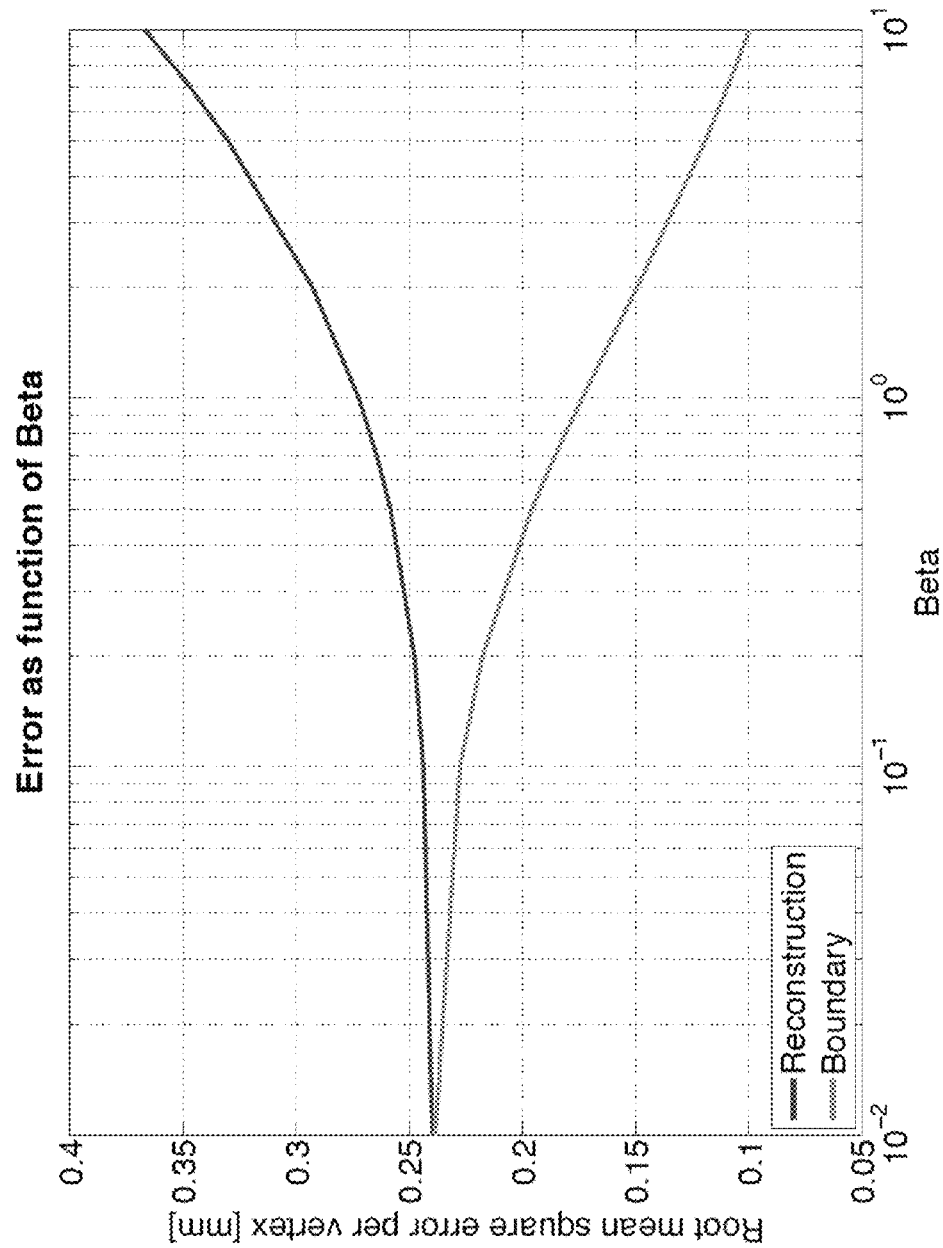
FIG. 12 is a graph depicting how reconstruction error and error at inter-region boundaries change as $\beta$ varies in one embodiment.
Figure 13A:
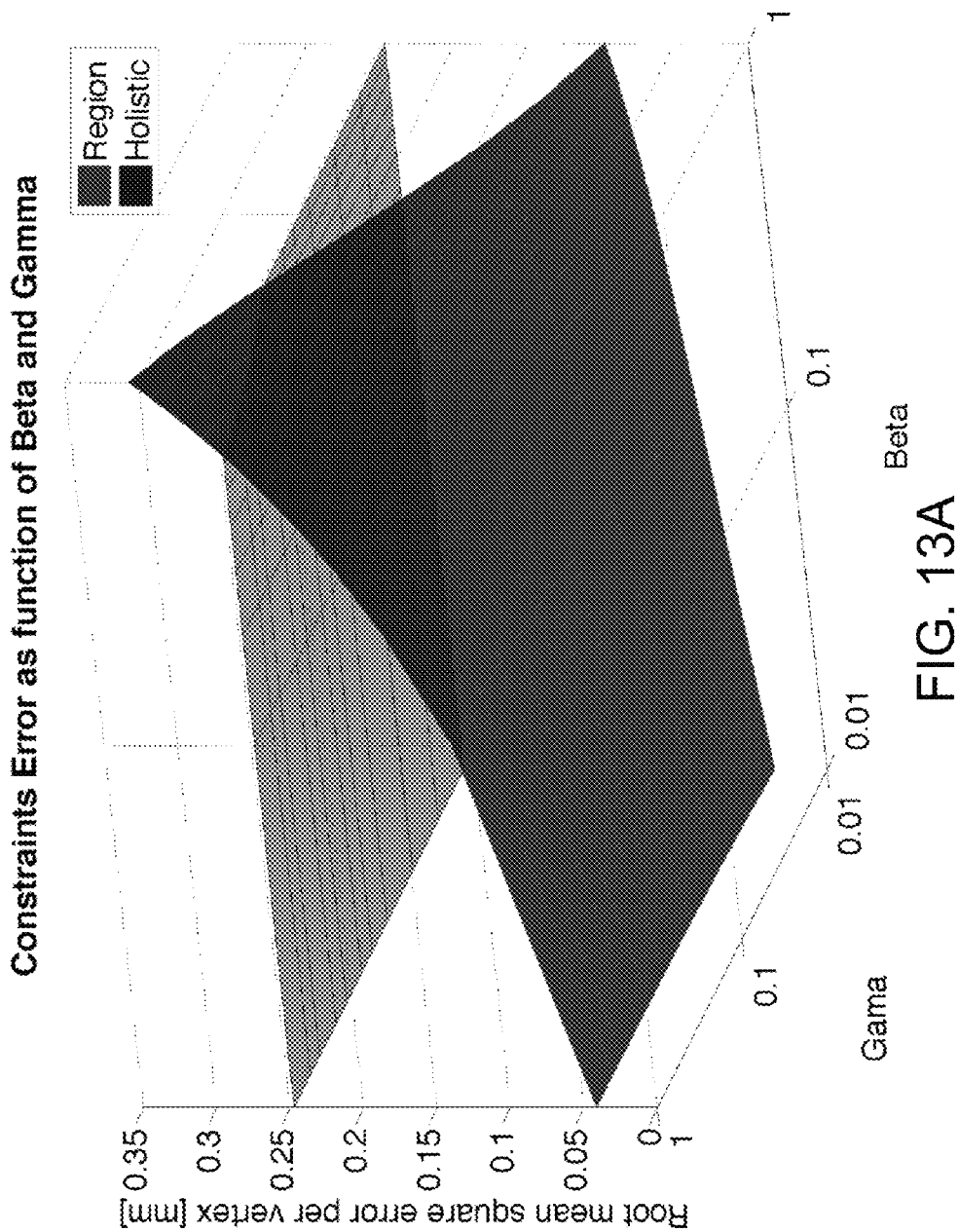
FIGS. 13A, 13B, and 13C are graphs depicting how behavior of region-based linear models created using techniques of this disclosure changes as intrinsic parameters are modified as compared to that of holistic models.
Figure 13B:
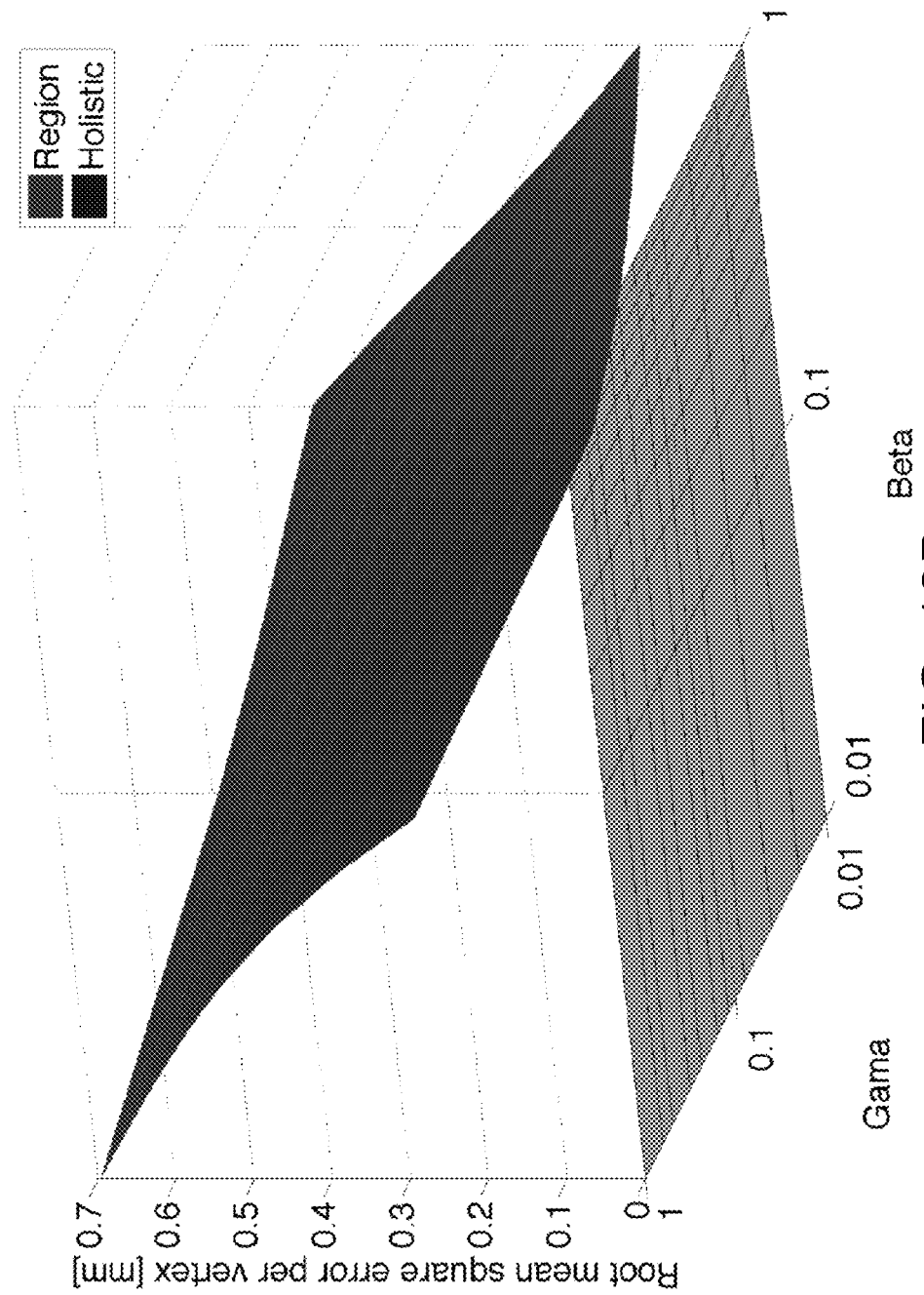
Figure 13C:
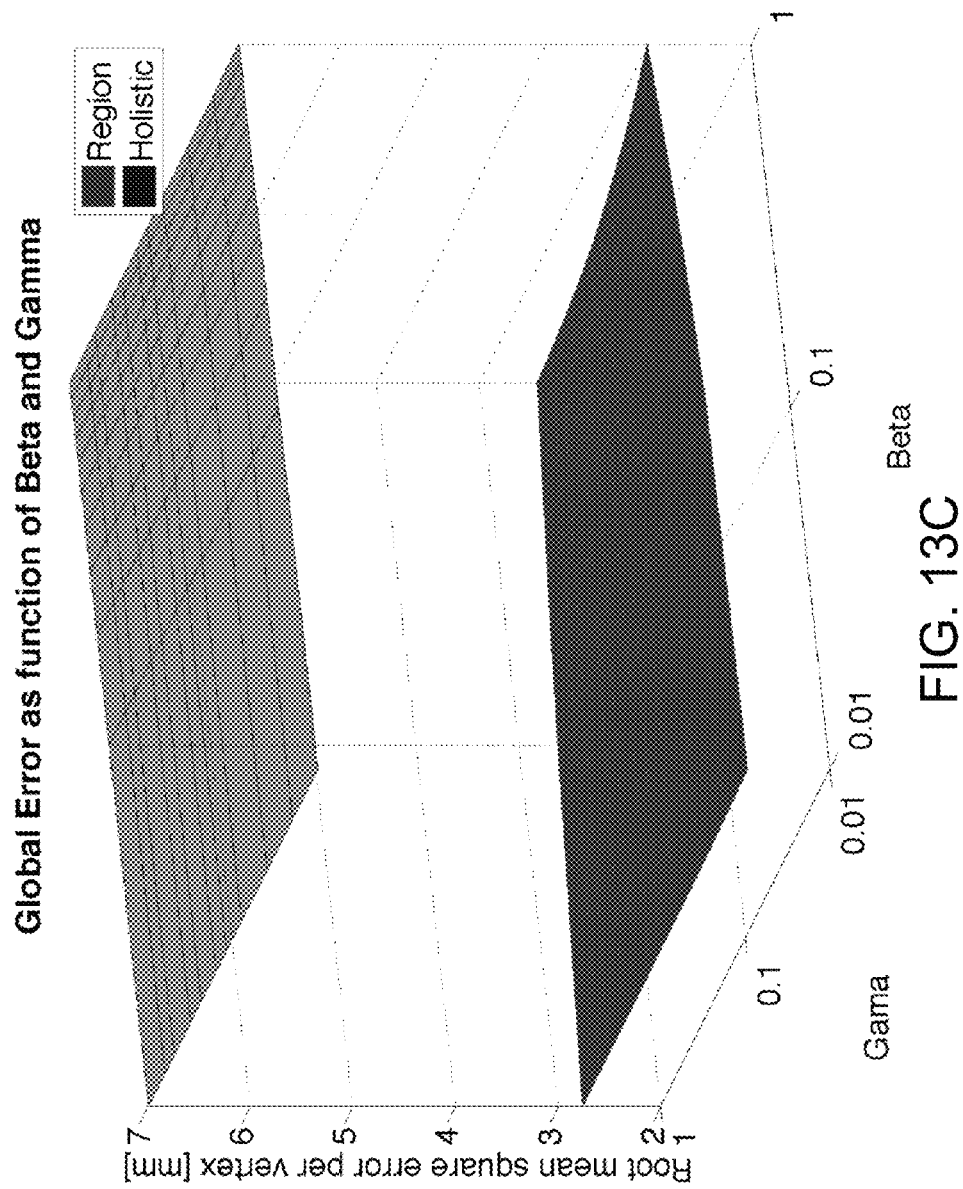

Intermediate values of $\beta$ and $\gamma$ allow the user to pin the face to a particular configuration by explicitly constraining its vertices. FIG. 12 is a graph depicting how reconstruction error and error at inter-region boundaries change as $\beta$ varies in one embodiment. FIGS. 13A, 13B, and 13C show the results of face posing experiments using various combinations of β and γ. FIGS. 13A, 13B, and 13C are graphs depicting how behavior of region-based linear models created using techniques of this disclosure changes as intrinsic parameters are modified as compared to that of holistic models. FIG. 13A is a graph depicting error between user-given constraints and constrained vertices outputted by a model of a computer-generated face. FIG. 13B is a graph depicting error at inter-region boundaries, which is null for the holistic model. FIG. 13C is a graph depicting error between all un-constrained vertices of a model of a computer-generated face and previous configuration states.

In these experiments both intrinsic parameters were varied in a range form 0.01 to 1. First, a submodel from the region-based model was randomly selected and configured by assigning random values to its PCA parameters. The resulting configuration was issued to the region-based and holistic models as a set of user-given constraints, and the corresponding equations were solved. This process was repeated 100 times for multiple combinations of β and γ, and three different error measures were calculated. The first was the error between the user given-constraints and the actual value of the constrained vertices:

$$E_{cnt} = \sqrt{\frac{1}{k}\sum_{j=1}^{k}\|x^j - \hat{x}^j\|^2} \,. \tag{14}$$

where $x^j$ are the user-given constraints, $\hat{x}^j$ are the corresponding constrained vertices and k is the number of constraints. This error is shown in FIG. 13A and it measures how well the model complies to user-given constraints. The second, shown in FIG. 13B, was the error at the inter-region boundaries; that is the difference in the estimates provided by the different submodels for the vertices they have in common:

$$E_{bnd} = \sqrt{\frac{1}{b}\sum_{i=1}^{M}\sum_{j=1}^{M}\|B_j^i c^i - B_i^j c^j\|^2} \,, \tag{15}$$

where b is the total number of boundary vertices, B are the bases for the boundary vertices and c are the parameters of each submodel. For the holistic model this error is null because it has no region boundaries. The third error is the difference between the original positions of the un-constrained vertices and their positions after the models were solved for the user-given constraints:

$$E_{glb} = \sqrt{\frac{1}{N-k}\sum_{i=1, i \neq j}^{N}\|x^i - \hat{x}^i\|^2} \tag{16}$$

where $x^i$ are the unconstrained vertices prior to solving the model, $\hat{x}^i$ are the unconstrained vertices after solving the model, k is the number of constraints, and N is the total number of vertices in the facial model. This error is shown in FIG. 13C and it measures how well the model is able to maintain the facial model unchanged while complying to user-given constraints.

Because the model requires only the solution of a linear system of equations, it can be implemented at interactive rates without the need for specialized hardware. A working prototype system has been implemented to interact with the region-based model to perform face posing and animation. The system allows the user to specify constraints by clicking on a face vertex and then dragging it to the desired location. Once the vertex is released, consecutive constraints may be added in the same manner to sculpt the desired pose.

Linear Systems of Equations

In various embodiments, system 100 solves the region-based model for reconstruction and imputation as discussed above. For the purposes of further illustration, assume a model with 3 regions a, b, and c all of which share vertices with the others. The corresponding linear system resulting from stacking the equations of the gradient of the error function shown in equation (9) is:

$$\begin{bmatrix} B_k^{a^T} B_k^a + \beta(B_b^{a^T} B_b^a + B_c^{a^T} B_c^a + \gamma I) & -\beta B_b^{a^T} B_a^b & -\beta B_c^{a^T} B_a^c \\ -\beta B_a^{b^T} B_b^a & B_k^{b^T} B_k^b + \beta(B_a^{b^T} B_a^b + B_c^{b^T} B_c^b + \gamma I) & -\beta B_c^{b^T} B_b^c \\ -\beta B_a^{c^T} B_c^a & -\beta B_b^{c^T} B_c^b & B_k^{c^T} B_k^c + \beta(B_a^{c^T} B_a^c + B_b^{c^T} B_b^c + \gamma I) \end{bmatrix} \tag{17}$$

$$\begin{bmatrix} c^a \\ c^b \\ c^c \end{bmatrix} = \begin{bmatrix} B_k^{a^T} v_k^a + \gamma c_0^a \\ B_k^{b^T} v_k^b + \gamma c_0^b \\ B_k^{c^T} v_k^c + \gamma c_0^c \end{bmatrix}$$

where I is the identity matrix.

CONCLUSION

Figure 14:
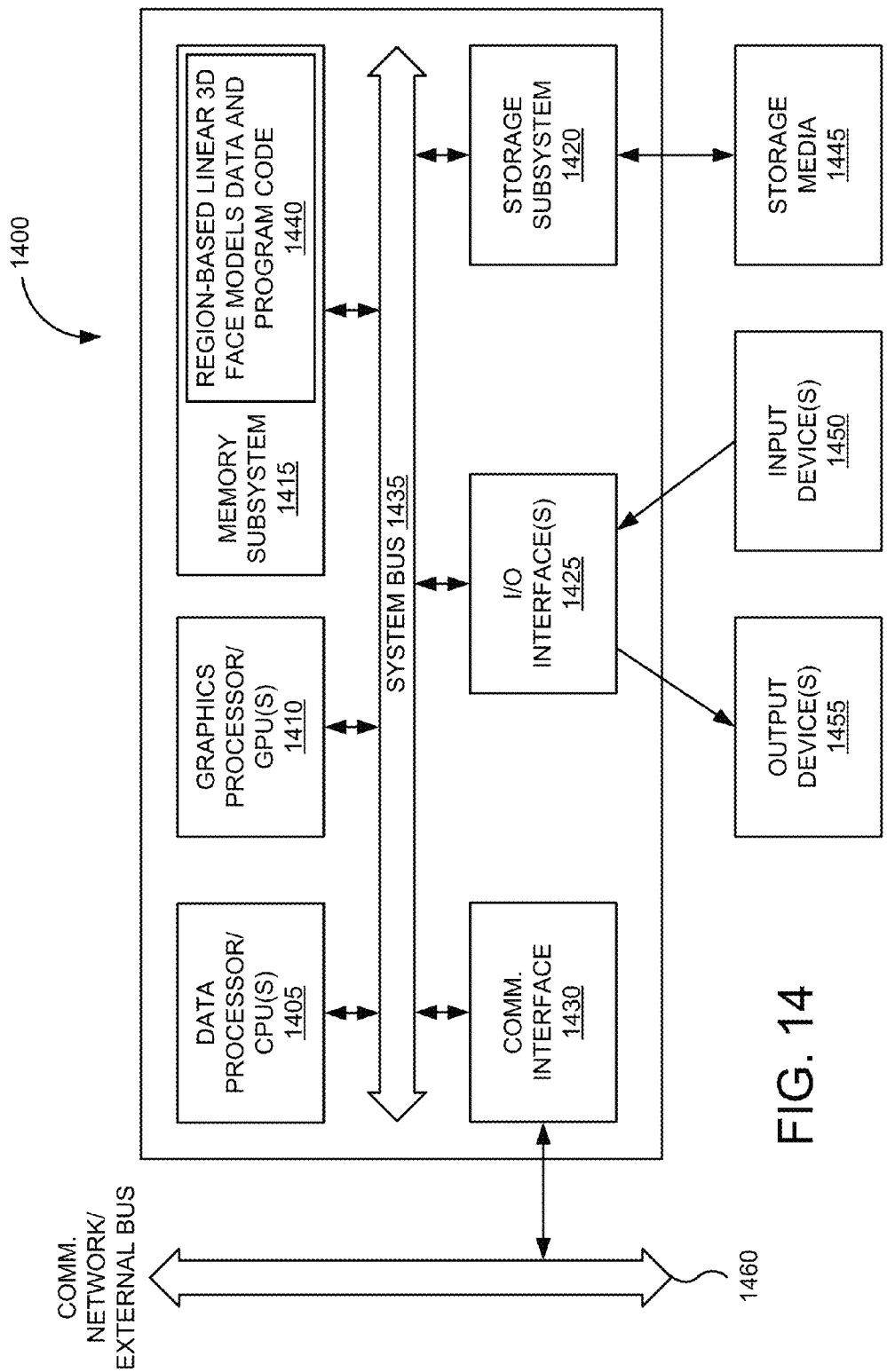
FIG. 14 is a block diagram of a computer system that may incorporate an embodiment, be incorporated into an embodiment, or be used to practice any of the innovations, embodiments, and/or examples found within this disclosure.

FIG. 14 is a block diagram of computer system 1400 that may incorporate an embodiment, be incorporated into an embodiment, or be used to practice any of the innovations, embodiments, and/or examples found within this disclosure. FIG. 14 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1400 can include hardware and/or software elements configured for performing logic operations and calculations, input/output operations, machine communications, or the like. Computer system 1400 may include familiar computer components, such as one or more one or more data processors or central processing units (CPUs) 1405, one or more graphics processors or graphical processing units (GPUs) 1410, memory subsystem 1415, storage subsystem 1420, one or more input/output (I/O) interfaces 1425, communications interface 1430, or the like. Computer system 1400 can include system bus 1435 interconnecting the above components and providing functionality, such connectivity and inter-device communication. Computer system 1400 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1405 can include hardware and/or software elements configured for executing logic or program code or for providing application-specific functionality. Some examples of CPU(s) 1405 can include one or more microprocessors (e.g., single core and multi-core) or micro-controllers. CPUs 1405 may include 4-bit, 8-bit, 12-bit, 16-bit, 32-bit, 64-bit, or the like architectures with similar or divergent internal and external instruction and data designs. CPUs 1405 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 1405 may also include one or more field-gate programmable arrays (FPGAs), application-specific integrated circuits (ASICs), or other microcontrollers. The one or more data processors or central processing units (CPUs) 1405 may include any number of registers, logic units, arithmetic units, caches, memory interfaces, or the like. The one or more data processors or central processing units (CPUs) 1405 may further be integrated, irremovably or moveably, into one or more motherboards or daughter boards.

The one or more graphics processor or graphical processing units (GPUs) 1410 can include hardware and/or software elements configured for executing logic or program code associated with graphics or for providing graphics-specific functionality. GPUs 1410 may include any conventional graphics processing unit, such as those provided by conventional video cards. Some examples of GPUs are commercially available from NVIDIA, ATI, and other vendors. In various embodiments, GPUs 1410 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1410 may include any number of registers, logic units, arithmetic units, caches, memory interfaces, or the like. The one or more data processors or central processing units (CPUs) 1405 may further be integrated, irremovably or moveably, into one or more motherboards or daughter boards that include dedicated video memories, frame buffers, or the like.

Memory subsystem 1415 can include hardware and/or software elements configured for storing information. Memory subsystem 1415 may store information using machine-readable articles, information storage devices, or computer-readable storage media. Some examples of these articles used by memory subsystem 1470 can include random access memories (RAM), read-only-memories (ROMS), volatile memories, non-volatile memories, and other semiconductor memories. In various embodiments, memory subsystem 1415 can include region-based linear 3D face model data and program code 1440.

Storage subsystem 1420 can include hardware and/or software elements configured for storing information. Storage subsystem 1420 may store information using machine-readable articles, information storage devices, or computer-readable storage media. Storage subsystem 1420 may store information using storage media 1445. Some examples of storage media 1445 used by storage subsystem 1420 can include floppy disks, hard disks, optical storage media such as CD-ROMS, DVDs and bar codes, removable storage devices, networked storage devices, or the like. In some embodiments, all or part of region-based linear 3D face model data and program code 1440 may be stored using storage subsystem 1420.

In various embodiments, computer system 1400 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1400 may also include one or more applications configured to execute, perform, or otherwise implement techniques disclosed herein. These applications may be embodied as region-based linear 3D face model data and program code 1440. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1415 and/or storage subsystem 1420.

The one or more input/output (I/O) interfaces 1425 can include hardware and/or software elements configured for performing I/O operations. One or more input devices 1450 and/or one or more output devices 1455 may be communicatively coupled to the one or more I/O interfaces 1425.

The one or more input devices 1450 can include hardware and/or software elements configured for receiving information from one or more sources for computer system 1400. Some examples of the one or more input devices 1450 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1450 may allow a user of computer system 1400 to interact with one or more non-graphical or graphical user interfaces to enter a comment, select objects, icons, text, user interface widgets, or other user interface elements that appear on a monitor/display device via a command, a click of a button, or the like.

The one or more output devices 1455 can include hardware and/or software elements configured for outputting information to one or more destinations for computer system 1400. Some examples of the one or more output devices 1455 can include a printer, a fax, a feedback device for a mouse or joystick, external storage systems, a monitor or other display device, a communications interface appropriately configured as a transceiver, or the like. The one or more output devices 1455 may allow a user of computer system 1400 to view objects, icons, text, user interface widgets, or other user interface elements.

A display device or monitor may be used with computer system 1400 and can include hardware and/or software elements configured for displaying information. Some examples include familiar display devices, such as a television monitor, a cathode ray tube (CRT), a liquid crystal display (LCD), or the like.

Communications interface 1430 can include hardware and/or software elements configured for performing communications operations, including sending and receiving data. Some examples of communications interface 1430 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1430 may be coupled to communications network/external bus 1480, such as a computer network, to a FireWire bus, a USB hub, or the like. In other embodiments, communications interface 1430 may be physically integrated as hardware on a motherboard or daughter board of computer system 1400, may be implemented as a software program, or the like, or may be implemented as a combination thereof.

In various embodiments, computer system 1400 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1400.

As suggested, FIG. 14 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method for manipulating a surface of a computer-generated face, the method comprising:

receiving, at one or more computer systems, information identifying a plurality of linear models associated with the surface of the computer-generated face, each linear model in the plurality of linear models corresponding to a region of the surface of the computer-generated face and modeling a set of behaviors for the region derived from a first data set;

receiving, at the one or more computer systems, a second data set associated with the surface of the computer-generated face, the second data set defining one or more manipulations to be performed to the surface of the computer-generated face;

determining for the one or more manipulations defined by the second data set, with one or more processors associated with the one or more computer systems, a solution globally applicable to the surface of the computer generated face that satisfies each continuity constraint in a set of one or more continuity constraints associated with the plurality of linear models and that reduces one or more error metrics, wherein the determining is performed in parallel for each of the plurality of linear models; and storing information configured based on the determined solution to manipulate the surface of the computer-generated face in a storage device associated with the one or more computer systems.

2. The method of claim 1 wherein the determining comprises solving for each linear model in the plurality of models while explicitly enforcing each continuity constraint in the set of one or more continuity constraints.

3. The method of claim 1 wherein determining for the one or more manipulations defined by the second data set, with the one or more processors associated with the one or more computer systems, the solution globally applicable to the surface of the computer generated face that satisfies each continuity constraint in the set of one or more continuity constraints associated with the plurality of linear models and that reduces the one or more error metrics comprises weighting contribution of each continuity constraint in the set of one or more continuity constraints to selected error metrics in the one or more error metrics.

4. The method of claim 1 further comprising:
receiving, at the one or more computer systems, information defining the surface of the computer-generated face;
receiving, at the one or more computer systems, the first data set including training data; and
determining, with the one or more processors associated with the one or more computer systems, a plurality of regions for the surface of the computer-generated face based on the training data.

5. The method of claim 4 wherein determining, with the one or more processors associated with the one or more computer systems, the plurality of regions for the surface of the computer-generated face based on the training data set comprises determining the plurality of regions using spectral clustering on a set of affinity matrices.

6. The method of claim 4 wherein determining, with the one or more processors associated with the one or more computer systems, the plurality of regions for the surface of the computer-generated face based on the training data set further comprises receiving information from a user guiding identification of at least one region in the plurality of regions.

7. The method of claim 4 wherein receiving, at the one or more computer systems, the first data including the training data comprises receiving the training data originating from a motion capture source.

8. The method of claim 1 further comprising generating, with the one or more processors associated with the one or more computer systems, the plurality of linear models based on the first data set.

9. The method of claim 1 further comprising generating, with the one or more processors associated with the one or more computer systems, at least one continuity constraint in the set of continuity constraints as a spatial constraint indicative of how much boundary is shared between at least two regions in the plurality of regions.

10. The method of claim 9 wherein the at least two regions in the plurality of regions share at least one vertex.

11. The method of claim 9 wherein the at least two regions in the plurality of regions overlap at least two vertices.

12. The method of claim 1 further comprising generating, with the one or more processors associated with the one or more computer systems, at least one continuity constraint in the set of continuity constraints as a temporal constraint indicative of how far a location moves over time in a parameter space.

13. The method of claim 1 further comprising generating, with the one or more processors associated with the one or more computer systems, the information configured based on the at least one solution to manipulate the surface of the computer-generated face as information configured to manipulate shape of the surface.

14. A non-transitory computer-readable medium storing computer-executable program code for manipulating a surface of a computer-animated character, the non-transitory computer-readable medium comprising:
code for receiving information identifying a plurality of linear models associated with the surface of the computer-generated face, each linear model in the plurality of linear models corresponding to a region of the surface of the computer-generated face and modeling a set of behaviors for the region derived from a first data set;
code for receiving a second data set associated with the surface of the computer-generated face, the second data set defining one or more manipulations to be performed to the surface of the computer-generated face;
code for determining, for the one or more manipulations defined by the second data set, a solution globally applicable to the surface of the computer generated face that satisfies each continuity constraint in a set of one or more continuity constraints associated with the plurality of linear models and that reduces one or more error metrics, wherein the determining is performed in parallel for each of the plurality of linear models; and
code for generating information configured based on the determined solution to manipulate the surface of the computer-generated face.

15. The non-transitory computer-readable medium of claim 14 wherein the determining comprises simultaneously solving for each linear model in the plurality of models while explicitly enforcing each continuity constraint in the set of one or more continuity constraints.

16. The non-transitory computer-readable medium of claim 14 wherein the code for determining, for the one or more manipulations defined by the second data set, the solution globally applicable to the surface of the computer generated face that satisfies each continuity constraint in the set of one or more continuity constraints associated with the plurality of linear models and that reduces the one or more error metrics comprises code for weighting contribution of each continuity constraint in the set of one or more continuity constraints to selected error metrics in the one or more error metrics.

17. The non-transitory computer-readable medium of claim 14 further comprising:
code for determining a plurality of regions for the surface of the computer-generated face based on training data included in the first data set.

18. The non-transitory computer-readable medium of claim 17 wherein the code for determining the plurality of regions for the surface of the computer-generated face based on the training data set comprises code for determining the plurality of regions using spectral clustering on a set of affinity matrices.

19. The non-transitory computer-readable medium of claim 17 wherein the code for determining the plurality of regions for the surface of the computer-generated face based on the training data set further comprises code for receiving information from a user guiding identification of at least one region in the plurality of regions.

20. The non-transitory computer-readable medium of claim 17 further comprising code for receiving the training data originating from a motion capture source.

21. The non-transitory computer-readable medium of claim 14 further comprising code for generating the plurality of linear models based on the first data set.

22. The non-transitory computer-readable medium of claim 14 further comprising code for generating at least one continuity constraint in the set of continuity constraints as a spatial constraint indicative of how much boundary is shared between at least two regions in the plurality of regions.

23. The non-transitory computer-readable medium of claim 22 wherein the at least two regions in the plurality of regions share at least one vertex.

24. The non-transitory computer-readable medium of claim 22 wherein the at least two regions in the plurality of regions overlap at least two vertices.

25. The non-transitory computer-readable medium of claim 14 further comprising code for generating at least one continuity constraint in the set of continuity constraints as a temporal constraint indicative of how far a location moves over time in a parameter space.

26. The non-transitory computer-readable medium of claim 14 wherein the code for generating the information configured based on the at least one solution to manipulate the surface of the computer-generated face comprises code for generating information configured to manipulate shape of the surface.

* * * * *